(12) United States Patent
Taguchi et al.

(10) Patent No.: US 8,058,339 B2
(45) Date of Patent: Nov. 15, 2011

(54) RUBBER COMPOSITION FOR TIRE AND PNEUMATIC TIRE

(75) Inventors: Takafumi Taguchi, Kobe (JP); Shuji Imaoka, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 0 days.

(21) Appl. No.: 12/596,973

(22) PCT Filed: Feb. 20, 2008

(86) PCT No.: PCT/JP2008/052834
§ 371 (c)(1),
(2), (4) Date: Oct. 21, 2009

(87) PCT Pub. No.: WO2008/139762
PCT Pub. Date: Nov. 20, 2008

(65) Prior Publication Data
US 2010/0130663 A1 May 27, 2010

(30) Foreign Application Priority Data

| | | |
|---|---|---|
| May 15, 2007 | (JP) | 2007-129540 |
| May 17, 2007 | (JP) | 2007-131975 |
| May 17, 2007 | (JP) | 2007-131976 |
| May 21, 2007 | (JP) | 2007-134409 |
| May 31, 2007 | (JP) | 2007-145732 |

(51) Int. Cl.
*C08K 3/22* (2006.01)
*C08K 3/26* (2006.01)

(52) U.S. Cl. ........ 524/432; 524/209; 524/424; 524/445; 524/449; 524/430; 524/451; 152/547

(58) Field of Classification Search ................ 152/547; 524/432, 209, 424, 445, 449, 430, 451
See application file for complete search history.

(56) References Cited

U.S. PATENT DOCUMENTS

| 5,447,976 A * | 9/1995 | Curtin et al. ................. 523/438 |
| 6,710,091 B1 | 3/2004 | Womelsdorf et al. |
| 2002/0037950 A1 | 3/2002 | Mizuno et al. |
| 2003/0079816 A1 | 5/2003 | Mizuno |
| 2003/0100661 A1 | 5/2003 | Kikuchi et al. |
| 2005/0027054 A1* | 2/2005 | Zimmer et al. .............. 524/432 |
| 2005/0197445 A1 | 9/2005 | Mizuno |
| 2006/0167165 A1 | 7/2006 | Hirayama et al. |
| 2006/0183840 A1 | 8/2006 | Hirayama et al. |
| 2007/0142529 A1* | 6/2007 | Uesaka et al. ............... 524/430 |

FOREIGN PATENT DOCUMENTS

| CN | 1386788 A | 12/2002 |
| EP | 1 505 115 A1 | 2/2005 |
| EP | 1 505 115 A1 * | 2/2005 |
| EP | 1 801 147 A1 | 6/2007 |
| JP | 5-222245 A | 8/1993 |
| JP | 7-81335 A | 3/1995 |
| JP | 7-118444 A | 5/1995 |
| JP | 2007-31587 A | 2/2000 |
| JP | 2000-154203 A | 6/2000 |
| JP | 2000-198883 A | 7/2000 |
| JP | 2002-37929 A | 2/2002 |
| JP | 2003-12866 A | 1/2003 |
| JP | 2003-55505 A | 2/2003 |
| JP | 2003-63206 A | 3/2003 |
| JP | 2003-192842 A | 7/2003 |
| JP | 2004-204099 A | 7/2004 |
| JP | 2005-132865 A | 5/2005 |
| JP | 2005-187594 A | 7/2005 |
| JP | 2005-247984 A | 9/2005 |
| JP | 2005-264114 A | 9/2005 |
| JP | 2006-199858 A | 8/2006 |
| JP | 2006-219631 A | 8/2006 |
| JP | 2007-84610 A | 4/2007 |
| JP | 2007-169431 A | 7/2007 |
| JP | 2007-177111 A | 7/2007 |
| JP | 2007-231104 A | 9/2007 |
| JP | 2007-302865 A | 11/2007 |
| JP | 2008-19334 A | 1/2008 |
| JP | 2008-285588 A | 11/2008 |
| KR | 1020040087706 A | 10/2004 |

OTHER PUBLICATIONS

Notification dated Sep. 7, 2010 in Japanese Application No. 2007-129540.
Office Action dated Aug. 10, 2010 in Japanese Application No. 2007-131976.

\* cited by examiner

*Primary Examiner* — Robert D. Harlan
(74) *Attorney, Agent, or Firm* — Birch, Stewart, Kolasch & Birch LLP

(57) ABSTRACT

A rubber composition tire containing 0.1 to 10 parts by mass of zinc oxide particles having an average particle diameter of not more than 200 nm with respect to 100 parts by mass of a rubber component and a pneumatic tire employing the same are provided. This rubber composition for a tire can be suitably employed for manufacturing tread rubber, base tread rubber, bead apex rubber, clinch rubber and inner liner rubber for a tire.

14 Claims, 1 Drawing Sheet

RUBBER COMPOSITION FOR TIRE AND PNEUMATIC TIRE

TECHNICAL FIELD

The present invention relates to a rubber composition employed for a tire, and more specifically, it relates to a rubber composition for a tread of a pneumatic tire, a rubber composition for a base tread, a rubber composition for a bead apex, a rubber composition for a clinch and a rubber composition for an inner liner. The present invention also relates to a pneumatic tire comprising tread rubber, base tread rubber, bead apex rubber, clinch rubber or inner liner rubber composed of the rubber composition.

BACKGROUND ART

In general, the compounding of a rubber composition for a tire remarkably depends on raw materials derived from petroleum resources. For example, a general tire for a passenger car on the market today contains about 20% of synthetic rubber, about 20% of carbon black, a softener, synthetic fiber and the like with respect to the total weight of the tire. In other words, at least 50% of the overall tire is constituted of raw materials derived from petroleum resources.

For example, synthetic rubber such as butadiene rubber (BR), carbon black etc. have been employed for a rubber composition for the tread of the tire, in order to improve gripping performance and abrasion resistance. Carbon black directed to low rolling resistance (LRR) has been blended into a rubber composition for the base tread of the tire, in addition to natural rubber (NR) exhibiting excellent rolling resistance. While the rigidity of bead apex rubber must be improved in order to obtain a tire having high steering stability, a large quantity of carbon black has generally been blended into a rubber composition for the bead apex, in order to improve the rigidity thereof.

Synthetic rubber and carbon black have been blended also into clinch rubber, in order to obtain a tire exhibiting excellent steering stability and extensibility in traveling in a well-balanced manner.

Further, butyl rubber, halogenated butyl rubber or the like having excellent air permeation resistance has been employed for inner liner rubber, and carbon black has also been blended into the same in order to improve flex cracking resistance. Both of the synthetic rubber such as butyl rubber or halogenated butyl rubber and carbon black are derived from petroleum resources.

In recent years, however, a special emphasis has been put on environmental issues, and the emission of carbon dioxide has been strictly limited. Further, the reserves of petroleum are limited, and hence raw materials derived from petroleum resources cannot be unlimitedly used. Such environmental awareness also affects the field of tires, to result in a demand for a rubber composition for a tire prepared by partially or entirely substituting raw materials derived from nonpetroleum resources for the currently used raw materials derived from petroleum resources. The substitutional raw materials derived from nonpetroleum resources must maintain characteristics at least equivalent to or superior to those of the raw materials derived from petroleum resources.

Japanese Patent Laying-Open No. 2003-63206 (Patent Document 1) discloses a rubber composition for a tread employing natural rubber or epoxidized natural rubber, silica etc. as raw materials derived from nonpetroleum resources for reducing dependency on petroleum resources. In this rubber composition for a tread, however, no abrasion resistance is taken into consideration, and the gripping performance thereof is still insufficient.

Japanese Patent Laying-Open No. 2003-55505 (Patent Document 2) discloses a rubber composition containing 0.1 to 20 parts by weight of zinc oxide having a specific surface area of at least 10 $m^2/g$ and preferably having an average particle diameter of at least 1 μm with respect to 100 parts by weight of a diene rubber component. However, this rubber composition is still insufficient in gripping performance and abrasion resistance.

Thus, no rubber composition having excellent gripping performance and abrasion resistance for serving as the material for a tread has been obtained with raw materials derived from nonpetroleum resources substituting for those derived from petroleum resources.

While a base tread of a tire must have excellent rolling resistance and high-speed durability, no such properties are taken into consideration in relation to the rubber composition disclosed in the aforementioned Patent Document 1.

Japanese Patent Laying-Open No. 2003-12866 (Patent Document 3) discloses a rubber composition for a base tread containing a rubber component, carbon black having a specific iodine adsorption, silica and sulfur. However, no high-speed durability is taken into consideration in relation to this rubber composition either.

Thus, a rubber composition having excellent low rolling resistance (LRR) and high-speed durability sufficiently applicable to base tread rubber is not yet known in relation to a rubber composition prepared by substituting raw materials derived from nonpetroleum resources for those derived from petroleum resources.

Japanese Patent Laying-Open No. 2002-37929 (Patent Document 4) discloses a rubber composition for a bead apex reinforced with used paper such as old newspaper in consideration of saving of resources and environmental protection. However, the rubber composition described in Patent Document 4 contains a large quantity of carbon black derived from petroleum resources as a filler for reinforcement along with the old paper, and saving of resources and environmental protection are not sufficiently taken into consideration. While the rigidity of the bead apex can be improved due to the large quantity of carbon black, the tire easily generates heat during traveling, and hence the durability of the tire is deteriorated due to reduction of dynamic fatigability. Further, the rolling resistance of the tire is disadvantageously increased due to increase of the loss tangent (tan δ).

Japanese Patent Laying-Open No. 2005-247984 (Patent Document 5) discloses a rubber composition for a clinch containing silica-containing carbon black and carbon black. However, the rubber composition for a clinch having different properties cannot be applied to a bead apex as such, while tensile strength and flex cracking resistance are not taken into consideration in this rubber composition.

A clinch rubber member is arranged on a region in contact with a rim over a sidewall and a bead of a tire, and positioned on a portion chafing against the rim when the tire is mounted on the rim. The clinch rubber member of the tire must have high hardness and high heat aging resistance in order to transmit driving force from the rim to the tire and to hold the load on the tire in traveling. Further, the clinch rubber member must have high abrasion resistance, in order to prevent abrasion resulting from chafing against the rim following repeated deformation of the tire in traveling. In addition, the rigidity, the hardness and the strength of the clinch rubber member remarkably influence the steering stability in traveling.

The clinch rubber member must also exhibit high breaking extension (extensibility), in order to prevent the toe of the tire from chipping frequently caused when the tire is exchanged.

Japanese Patent Laying-Open No. 7-118444 (1995: Patent Document 6) proposes a hard rubber composition employing polybutadiene rubber containing at least 5 percent by weight of syndiotactic crystals as a rubber composition employed for the clinch rubber member required to have excellent properties. Japanese Patent Laying-Open No. 7-81335 (1995: Patent Document 7) discloses a chafer rubber member consisting of a composite rubber strip prepared by bonding several types of rubber components having different blending ratios and characteristics to each other. In order to prepare a multilayered clinch or chafer rubber member, however, the manufacturing steps are complicated, to result in a high cost.

Japanese Patent Laying-Open No. 2000-198883 (Patent Document 8) discloses a rubber composition for a tire tread compatibly attaining low rolling resistance and high abrasion resistance by blending a specific quantity of a carbon black material containing silica. If this technique is applied to a clinch rubber member required to have high rigidity and high hardness, however, steering stability and extensibility cannot be improved in a well-balanced manner. The aforementioned Patent Document 5 describes the rubber composition for a clinch containing silica-containing carbon black and carbon black. However, this rubber composition is still insufficient in tensile strength and abrasion resistance.

An inner liner is a rubber member forming the inner surface of a pneumatic tire, particularly a tubeless tire, for retaining the internal pressure of the tire. While the inner liner rubber member must have excellent air permeation resistance and flex cracking resistance, neither air permeation resistance nor flex cracking resistance is taken into consideration in relation to the aforementioned rubber composition according to Patent Document 1.

Japanese Patent Laying-Open No. 2005-264114 (Patent Document 9) discloses a rubber composition prepared by dispersing a specific quantity of zinc oxide into a rubber component containing halogenated butyl rubber and/or a halide of a copolymer of isobutylene and p-methylstyrene and kneading the same an inner liner consisting of this rubber composition, and describes that the rubber gauge of the inner liner or the like can be kept thin and the weight of the tire can be reduced without reducing the viscosity. However, no technique of compatibly attaining air permeation resistance and flex cracking resistance of the inner liner rubber is taken into consideration.

Thus, a rubber composition having excellent air permeation resistance and flex cracking resistance sufficiently employable as the material for an inner liner is not yet known in relation to a rubber composition prepared from raw materials derived from nonpetroleum resources substituting for those derived from petroleum resources.

Patent Document 1: Japanese Patent Laying-Open No. 2003-63206
Patent Document 2: Japanese Patent Laying-Open No. 2003-55505
Patent Document 3: Japanese Patent Laying-Open No. 2003-12866
Patent Document 4: Japanese Patent Laying-Open No. 2002-37929
Patent Document 5: Japanese Patent Laying-Open No. 2005-247984
Patent Document 6: Japanese Patent Laying-Open No. 7-118444
Patent Document 7: Japanese Patent Laying-Open No. 7-81335
Patent Document 8: Japanese Patent Laying-Open No. 2000-198883
Patent Document 9: Japanese Patent Laying-Open No. 2005-264114

DISCLOSURE OF THE INVENTION

Problems to be Solved by the Invention

The present invention has been proposed in order to solve the aforementioned problems, and an object thereof is to provide a rubber composition for a tire having higher contents of raw materials derived from nonpetroleum resources as compared with the prior art with sufficient consideration on saving of resources and environmental protection and exhibiting excellent performance and satisfying characteristics required to each portion whether the same is applied to a tread, a base tread, a bead apex, a clinch or an inner liner.

Another object of the present invention is to provide a pneumatic tire comprising tread rubber, base tread rubber, bead apex rubber, clinch rubber or inner liner rubber consisting of the aforementioned rubber composition.

Means for Solving the Problems

The present invention provides a rubber composition for a tire containing 0.1 to 10 parts by mass of zinc oxide particles having an average particle diameter of not more than 200 nm with respect to 100 parts by mass of a rubber component. The rubber composition for a tire according to the present invention can be suitably employed for manufacturing tread rubber, base tread rubber, bead apex rubber, clinch rubber and inner liner rubber for a tire.

If the rubber composition according to the present invention is a rubber composition (hereinafter referred to as a rubber composition for a tread) employed for manufacturing tread rubber, the rubber component preferably contains epoxidized natural rubber (ENR). The rubber composition for a tread according to the present invention preferably further contains 60 to 90 parts by mass of silica with respect to 100 parts by mass of the rubber component.

If the rubber composition according to the present invention is a rubber composition (hereinafter referred to as a rubber composition for a base tread) employed for manufacturing base tread rubber, the rubber component preferably contains natural rubber (NR). The rubber composition for a base tread according to the present invention preferably further contains 30 to 50 parts by mass of silica with respect to 100 parts by mass of the rubber composition.

If the rubber composition according to the present invention is a rubber composition (hereinafter referred to as a rubber composition for a bead apex) employed for manufacturing bead apex rubber, the rubber component preferably contains at least natural rubber, and preferably consists of substantially only natural rubber. The rubber composition for a bead apex according to the present invention preferably further contains 15 to 90 parts by mass of silica with respect to 100 parts by mass of natural rubber.

If the rubber composition according to the present invention is a rubber composition (hereinafter referred to as a rubber composition for a clinch) employed for manufacturing clinch rubber, the rubber component preferably contains 30 to 90 percent by mass of natural rubber and 10 to 70 percent by mass of epoxidized natural rubber. The rubber composition for a clinch according to the present invention preferably further contains 15 to 90 parts by mass of silica with respect to 100 parts by mass of the rubber component.

If the rubber composition according to the present invention is a rubber composition (hereinafter referred to as a rubber composition for an inner liner) employed for manufacturing inner liner rubber, the rubber component preferably contains epoxidized natural rubber (ENR). The rubber composition for an inner liner according to the present invention preferably further contains 30 to 50 parts by mass of silica with respect to 100 parts by mass of the rubber component.

The present invention also provides a pneumatic tire comprising tread rubber, base tread rubber, bead apex rubber, clinch rubber or inner liner rubber consisting of the aforementioned rubber composition for a tire.

Effects of the Invention

The present invention provides a rubber composition for a tire having higher contents of raw materials derived from nonpetroleum resources as compared with the prior art with sufficient consideration on saving of resources and environmental protection and exhibiting excellent performance and satisfying characteristics required to each portion whether the same is applied to a tread, a base tread, a bead apex, a clinch or an inner liner and a pneumatic tire comprising tread rubber, base tread rubber, bead apex rubber, clinch rubber or inner liner rubber consisting of the aforementioned rubber composition.

Figure 1:
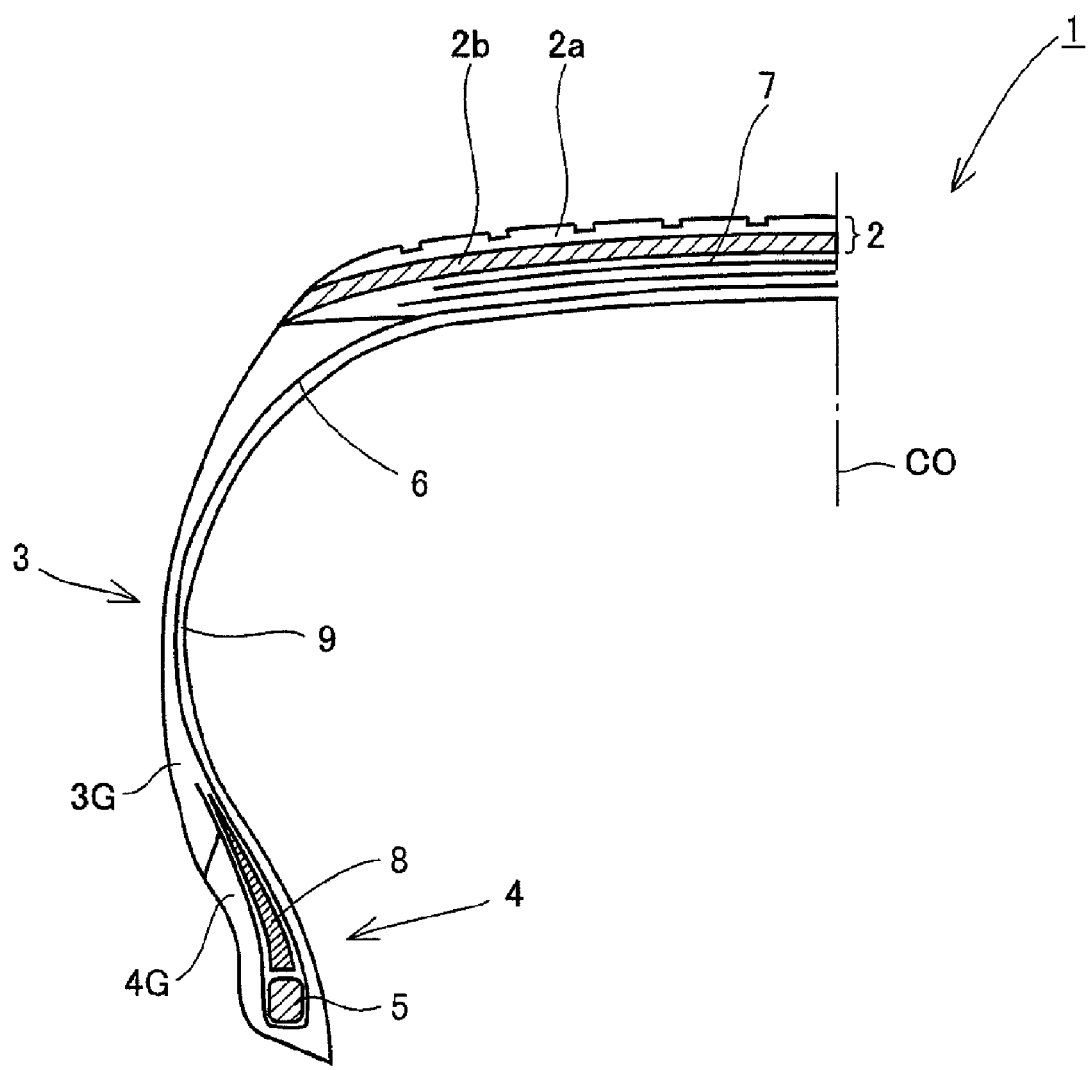
FIG. 1 is a schematic sectional view showing an exemplary pneumatic tire according to the present invention.

DESCRIPTION OF THE REFERENCE SIGNS 1 tire, 2 tread portion, 2a cap tread portion, 2b base tread portion, 3 sidewall portion, 4 bead portion, 5 bead core, 6 carcass, 7 belt layer, 8 bead apex rubber, 9 inner liner rubber, 3G sidewall rubber, 4G clinch rubber

BEST MODES FOR CARRYING OUT THE INVENTION

A rubber composition for a tire according to the present invention contains 0.1 to 10 parts by mass of zinc oxide particles having an average particle diameter of not more than 200 nm with respect to 100 parts by mass of a rubber component. The rubber composition for a tire according to the present invention can be suitably employed as a rubber composition for a tread, a rubber composition for a base tread, a rubber composition for a bead apex, a rubber composition for a clinch and a rubber composition for an inner liner. These rubber compositions are now described in detail.

<Rubber Composition for Tread>

The rubber composition for a tread according to the present invention contains 0.1 to 10 parts by mass of the zinc oxide particles having the average particle diameter of not more than 200 nm with respect to 100 parts by mass of a rubber component. This rubber composition for a tread according to the present invention supplies excellent gripping performance and abrasion resistance to the tire.

(Rubber Component)

At least one rubber component selected from natural rubber (NR), epoxidized natural rubber (ENR), deproteinized natural rubber (DPNR) and other natural-based rubber as well as diene-based synthetic rubber is blended into the rubber composition for a tread according to the present invention.

If the rubber composition for a tread according to the present invention contains natural rubber (NR), the content of the natural rubber (NR) in the rubber component is not particularly restricted but can be set to at least about 5 percent by mass, for example. If the rubber composition contains natural-based rubber other than NR as the rubber component, however, the content of the natural rubber may be smaller than at least about 5 percent by mass. If containing the natural-based rubber other than NR as the rubber component, the rubber composition may not contain NR. If the rubber composition for a tread contains only NR as the natural-based rubber component, on the other hand, the NR content in the rubber component is preferably at least 90 percent by mass, more preferably at least 95 percent by mass. If the NR content is less than 90 percent by mass, the ratio of nonpetroleum resources in the rubber composition is reduced.

The natural rubber (NR) can be prepared from a material of the grade RSS#3, TSR20 or SIR20, for example, generally employed in the rubber industry.

The rubber composition for a tread according to the present invention preferably contains epoxidized natural rubber (ENR) as the rubber component. The epoxidized natural rubber (ENR) is prepared by epoxidizing unsaturated double bonds of natural rubber, and the molecular cohesion thereof is improved due to epoxy groups which are polar groups. Therefore, the epoxidized natural rubber has a higher glass transition temperature (Tg) than natural rubber (NR), and is excellent in mechanical strength, abrasion resistance and air permeation resistance. Particularly when silica is blended into the rubber composition, mechanical strength and abrasion strength substantially equal to those of a rubber composition containing carbon black can be attained due to reaction between silanol groups on the surface of silica and the epoxy groups of the epoxidized natural rubber.

The epoxidized natural rubber (ENR) may be prepared from a commercially available material, or may be prepared by epoxidizing natural rubber (NR). The method of epoxidizing NR is not particularly limited but chlorohydrin synthesis, direct oxidation, a hydrogen peroxide process, an alkylhydroperoxide process, a peracid process or the like can be employed. As the peracid process, a process of reacting organic peracid such as peracetic acid or performic acid with natural rubber can be employed.

The epoxidation ratio of the epoxidized natural rubber (ENR) is preferably at least 5 mole percent, more preferably at least 10 mole percent. If the epoxidation ratio of ENR is less than 5 mole percent, the effect of improving gripping performance tends to reduce. Further, the epoxidation ratio of the epoxidized natural rubber (ENR) is preferably not more than 60 mole percent, more preferably not more than 55 mole percent. If the epoxidation ratio of ENR exceeds 60 mole percent, the strength of obtained tread rubber is insufficient, and bondability to general-purpose rubber tends to reduce. In this specification, the epoxidation ratio of the epoxidized natural rubber (ENR) is expressed as (number of epoxidized double bonds)/(number of unepoxidized double bonds)×100(%).

If the rubber composition for a tread according to the present invention contains the epoxidized natural rubber (ENR), the ENR content in the rubber component can be set to at least about 5 percent by mass, for example. If the rubber composition contains natural-based rubber other than ENR as the rubber component, however, the ENR content may be smaller than about 5 percent by mass. If the rubber composition for a tread contains only ENR as the natural-based rubber component, on the other hand, the ENR content in the rubber component is preferably at least 90 percent by mass, more preferably at least 95 percent by mass. If the ENR content is less than 90 percent by mass, the ratio of nonpetroleum resources in the rubber composition is reduced.

The ratio of ENR in the natural-based rubber component blended into the rubber composition is preferably higher, and can be set to at least 50 percent by mass, for example, more preferably at least 70 percent by mass, further preferably at least 90 percent by mass. The effect of improving the gripping performance can be further improved by increasing the ratio of ENR in the natural-based rubber component. The rubber composition for a tread according to the present invention may contain only ENR as the rubber component. Thus, the gripping force of the tread is improved, and excellent steering stability can be obtained.

The rubber composition for a tread according to the present invention may contain deproteinized natural rubber (DPNR) as the rubber component. In general, natural rubber (NR) contains about 5 to 10 percent by mass of nonrubber components such as protein and lipid. These nonrubber components, particularly protein, are regarded as responsible for entanglement between molecular chains, leading to gelation. In order to avoid this problem, the deproteinized natural rubber (DPNR) prepared by removing nonrubber components from natural rubber is remarkably advantageously blended into the rubber composition.

The weight-average molecular weight (gel permeation chromatography (GPC) in terms of polystyrene) of the deproteinized natural rubber (DPNR) is preferably at least 1,400,000. If the weight-average molecular weight is less than 1,400,000, raw rubber strength is reduced. The nitrogen content of the deproteinized natural rubber (DPNR) is preferably not more than 0.1 percent by mass, more preferably not more than 0.08 percent by mass, further preferably not more than 0.05 percent by mass. If the nitrogen content exceeds 0.1 percent by mass, gelation is disadvantageously caused. The nitrogen content of the deproteinized natural rubber (DPNR) is measured by an RRIM (Rubber Research Institute of Malaysia) method.

If the rubber composition for a tread according to the present invention contains the deproteinized natural rubber (DPNR), the content of the deproteinized natural rubber (DPNR) in the rubber component is not particularly limited but can be set to at least about 5 percent by mass, for example. If the rubber composition contains natural-based rubber other than DPNR as the rubber component, however, the DPNR content may be smaller than about 5 percent by mass. If containing natural-based rubber other than DPNR as the rubber component, the rubber composition may not contain DPNR. If the rubber composition for a tread contains only DPNR as the natural-based rubber component, on the other hand, the DPNR content in the rubber component is preferably at least 90 percent by mass, more preferably at least 95 percent by mass. If the DPNR content is less than 90 percent by mass, the ratio of nonpetroleum resources in the rubber composition is reduced, and abrasion resistance tends to reduce.

The deproteinized natural rubber (DPNR) can be obtained by deproteinizing natural rubber (NR). The natural rubber (NR) can be deproteinized by any of the following methods, for example:

(1) A method of decomposing protein by adding a proteolytic enzyme or bacteria to natural rubber latex.

(2) A method of decomposing protein by adding alkali to natural rubber latex and heating the mixture.

(3) A method of liberating protein adsorbed to natural rubber latex with a surface active agent.

The natural rubber latex employed for the deproteinizing treatment is not particularly limited but field latex, ammoniated latex or the like can be employed.

While the proteolytic enzyme employed in the aforementioned method (1) can be prepared from a well-known material and is not particularly limited, protease or the like is suitably employed, for example. The protease may be derived either from bacteria or from yeast, protease derived from bacteria is preferable. Further, another enzyme such as lipase, esterase, amylase, laccase or cellulase may also be employed.

If alkaline protease is employed as the proteolytic enzyme, the activity thereof is preferably in the range of 0.1 to 50 APU/g, more preferably in the range of 1 to 25 APU/g. The activity of the proteolytic enzyme is measured by a modification of Anson's hemoglobin method [Anson, M. L., J. Gen. Physiol., 22, 79 (1938)]. The proteolytic enzyme is reacted in a solution so adjusted that the final concentration of urea-denatured hemoglobin employed as the substrate is 14.7 mg/ml at a temperature of 25° C. at the pH of 10.5 for 10 minutes, and trichloroacetic acid is thereafter added to the reacted solution so that the final concentration is 31.25 mg/ml. Then, soluble matter of trichloroacetic acid is colored with a phenolic reagent, activity per 10-minute reaction is obtained through a calibration curve setting the degree of coloration of 1 mole of tyrosine as 1 APU, and the obtained activity is converted to a level per minute. 1 APU corresponds to the quantity of protease supplying trichloroacetic acid soluble matter of the same degree of coloration as 1 mole of tyrosine colored with the phenolic reagent.

The content of the proteolytic enzyme, properly set in response to the enzyme activity, is generally 0.0001 to 20 parts by mass, preferably 0.001 to 10 parts by mass with respect to 100 parts by mass of the solid matter of the natural rubber latex. There is a possibility that the protein contained in the natural rubber latex cannot be sufficiently decomposed if the content of the proteolytic enzyme is smaller than 0.0001 parts by mass, while the activity of the enzyme is reduced and the const is increased if the content exceeds 20 parts by mass.

The treatment time with the proteolytic enzyme is not particularly limited but can be properly set in response to the enzyme activity. In general, the treatment is preferably performed for several minutes to about one week. During the treatment with the proteolytic enzyme, the natural rubber latex may be either stirred or allowed to stand. Further, the treatment temperature may be adjusted if necessary, and a proper treatment temperature is 5 to 90° C., preferably 20 to 60° C. The enzyme is rapidly inactivated if the treatment temperature exceeds 90° C., while the enzyme reaction is hard progress if the treatment temperature is less than 5° C.

For example, at least one or two of an anionic surface active agent, a nonionic surface active agent and an amphoteric surface active agent can be used as the surface active agent employed in the aforementioned method (3). A carboxylic acid-based, sulfonic acid-based, sulfate-based or phosphate-based surface active agent can be listed as the anionic surface active agent, for example. A polyoxyalkylene ether-based, polyoxyalkylene ester-based, polyhydric alcohol fatty acid-based, saccharic fatty ester-based or alkylpolyglycoside-based surface active agent is suitably used as the nonionic surface active agent, for example. An amino acid-type, betaine-type or amine oxide-type surface active agent ca be listed as the amphoteric surface active agent, for example.

In the aforementioned method (3), protein adsorbed to the natural rubber latex is liberated by washing the natural rubber latex with the surface active agent. The natural rubber latex may be washed with the surface active agent either in a state not yet treated with an enzyme or in a state completely treated with the enzyme. More specifically, the natural rubber latex not yet treated or completely treated with the enzyme can be washed by adding the surface active agent thereto and centrifuging the same or by aggregating and separating natural rubber latex particles. Centrifugation can be performed once or a several times. In general, deproteinized natural rubber latex from which protein is highly removed can be obtained by single centrifugation. The centrifugation may be performed after diluting the natural rubber latex so that the content of the rubber component is 5 to 40 percent by mass, preferably 10 to 30 percent by mass.

The content of the surface active agent is 0.001 to 20 parts by mass, preferably 0.001 to 15 parts by mass with respect to 100 parts by mass of the solid content of the natural rubber latex.

When the proteolytic enzyme or the surface active agent is employed in the aforementioned method (1) or (3), another additive such as a pH adjuster or a disperser, for example, may be added.

The pH adjuster can be prepared from phosphate such as potassium dihydrogen phosphate, potassium hydrogen phosphate, sodium dihydrogen phosphate or sodium hydrogen phosphate, acetate such as potassium acetate or sodium acetate, acid such as sulfuric acid, acetic acid, hydrochloric acid, nitric acid, citric acid or succinic acid or salt thereof, ammonia, potassium hydroxide, sodium hydroxide, sodium carbonate or sodium hydrogen carbonate, for example. In general, the content of the pH adjuster is 0.01 to 0.5 parts by mass with respect to 100 parts by mass of the rubber solid content of the natural rubber latex.

The disperser can be prepared from a styrene-sulfonic acid copolymer, a naphthalenesulfonic acid formalin condensate, lignin sulfonic acid, a polycyclic aromatic sulfonic acid copolymer, acrylic acid, a homopolymer or a copolymer of maleic anhydride or a copolymer of isobutylene-acrylic acid and isobutylene-maleic anhydride, for example.

The deproteinized natural rubber latex obtained in the aforementioned manner may be coagulated after or without removing the nonrubber components by centrifugation or the like. The coagulation method is not particularly limited but the deproteinized natural rubber latex can be coagulated by a well-known method. In general, the deproteinized natural rubber latex is coagulated by a method labilzing and coagulating latex rubber particles by adding acid such as formic acid or sulfuric acid or salt such as sodium chloride or a method labilzing and coagulating latex rubber particles through the cloud point of the surface active agent.

The gel content of the deproteinized natural rubber is preferably not more than 10 percent by mass. If the gel content exceeds 10 percent by mass, the viscosity of unvulcanized rubber tends to increase and workability tends to lower. The gel content is measured as a toluene insoluble.

The rubber composition for a tread according to the present invention may further contain other modified natural rubber than the above or diene-based synthetic rubber. The diene-based synthetic rubber can be prepared from styrene-butadiene rubber (SBR), butadiene rubber (BR), styrene-isoprene copolymer rubber, isoprene rubber (IR), isobutylene-isoprene rubber (IIR), chloroprene rubber (CR), acrylonitrile-butadiene rubber (NBR), halogenated isobutylene-isoprene rubber (X-IIR) or a halide of a copolymer of isobutylene and p-methylstyrene, for example.

If the rubber composition for a tread according to the present invention contains diene-based synthetic rubber, the content of the diene-based synthetic rubber in the rubber component is preferably set to not more than 10 percent by mass. The rubber composition for a tread according to the present invention more preferably contains no diene-based synthetic rubber, in order to increase the content of nonpetroleum resources in consideration of saving of resources and environmental protection.

(Zinc Oxide)

The rubber composition for a tread according to the present invention contains the zinc oxide particles having the average particle diameter of not more than 200 nm. In the present invention, the average particle diameter of the zinc oxide particles is measured by laser beam scattering employing a nanoparticle diameter distribution measuring apparatus by Shimadzu Corporation.

Zinc oxide is blended into the rubber composition for a tread according to the present invention as a supplement vulcanization accelerator. When the rubber composition for a tread according to the present invention contains the zinc oxide particles having the average particle diameter of not more than 200 nm, cracking resulting from zinc oxide can be effectively prevented, and gripping performance and abrasion resistance of the obtained tread rubber can be improved. If the average particle diameter of the zinc oxide particles exceeds 200 nm, the particles may serve as base points of cracking, and the gripping performance and the abrasion resistance of the obtained tread rubber cannot be sufficiently improved. In order to further improve the gripping performance and the abrasion resistance, the average particle diameter of the zinc oxide particles is preferably not more than 150 nm, more preferably not more than 100 nm. Further, the average particle diameter of the zinc oxide particles is preferably at least 1 nm, more preferably at least 10 nm. If the average particle diameter of the zinc oxide particles is less than 1 nm, zinc oxide tends to be inferior in dispersibility into the rubber composition.

Zinc oxide is a nonpetroleum resource, and the rubber composition for a tire containing the same can be regarded as an earth-friendly rubber composition with due consideration of saving of resources and environmental protection.

The content of the zinc oxide particles having the average particle diameter of not more than 200 nm is at least 0.1 parts by mass, preferably at least 0.5 parts by mass, more preferably at least 1.0 part by mass with respect to 100 parts by mass of the rubber component. If the content of the zinc oxide particles having the average particle diameter of not more than 200 nm is less than 0.1 parts by mass, the effect of zinc oxide serving as a supplement vulcanization accelerator tends to be hardly attainable. Further, the content of the zinc oxide particles having the average particle diameter of not more than 200 nm is not more than 10 parts by mass, preferably not more than 2.5 parts by mass with respect to 100 parts by mass of the rubber component. If the content of the zinc oxide particles having the average particle diameter of not more than 200 nm exceeds 10 parts by mass, the abrasion resistance tends to reduce.

The rubber composition for a tread according to the present invention may further contain zinc oxide particles having an average particle diameter of at least 200 nm along with the zinc oxide particles having the average particle diameter of not more than 200 nm. However, the content of the zinc oxide particles having the average particle diameter of at least 200 nm is preferably not more than 2.5 parts by mass, more preferably not more than 1.5 parts by mass with respect to 100 parts by mass of the rubber component. If the content of the zinc oxide particles having the average particle diameter of at least 200 nm exceeds 2.5 parts by mass, the abrasion resistance tends to deteriorate. If the rubber composition for a tread according to the present invention further contains the zinc oxide particles having the average particle diameter of at least 200 nm, the ratio (mass ratio) of the zinc oxide particles having the average particle diameter of at least 200 nm to the zinc oxide particles having the average particle diameter of not more than 200 nm is preferably not more than 5, more preferably not more than 3. If this ratio exceeds 5, the abrasion resistance tends to deteriorate.

(Silica)

The rubber composition for a tread according to the present invention preferably further contains silica. Silica functions as a reinforcing filler, and the abrasion resistance of the obtained tread rubber can be improved by blending silica into the rubber composition for a tread.

Silica may be prepared either by a wet method or by a dry method.

The BET specific surface area of silica is preferably at least 100 $m^2/g$, more preferably at least 120 $m^2/g$. If the BET specific surface area of silica is less than 100 $m^2/g$, the reinforcing effect is insufficient. Further, the BET specific surface area of silica is preferably not more than 300 $m^2/g$, more preferably not more than 280 $m^2/g$. If the BET specific surface area of silica exceeds 300 $m^2/g$, dispersibility is reduced, and exothermicity of the tread rubber tends to increase.

If the rubber composition for a tread according to the present invention contains silica, the content of silica is preferably at least 60 parts by mass, more preferably at least 70 parts by mass with respect to 100 parts by mass of the rubber component. If the content of silica is less than 60 parts by mass, sufficient abrasion resistance tends to be unattainable. Further, the content of silica is preferably not more than 90 parts by mass, more preferably not more than 80 parts by mass with respect to 100 parts by mass of the rubber component. If the content of silica exceeds 90 parts by mass, excellent rolling resistance tends to be unattainable.

(Silane Coupling Agent)

When containing silica, the rubber composition for a tread according to the present invention preferably contains a silane coupling agent along with silica. The silane coupling agent can be prepared from a well-known silane coupling agent such as a sulfide-based silane coupling agent such as bis(3-triethoxysilylpropyl)tetrasulfide, bis(2-triethoxysilylethyl) tetrasulfide, bis(4-triethoxysilylbutyl)tetrasulfide, bis(3-trimethoxysilylpropyl)tetrasulfide, bis(2-trimethoxysilylethyl) tetrasulfide, bis(4-trimethoxysilylbutyl)tetrasulfide, bis(3-triethoxysilylpropyl)trisulfide, bis(2-triethoxysilylethyl) trisulfide, bis(4-triethoxysilylbutyl)trisulfide, bis(3-trimethoxysilylpropyl)trisulfide, bis(2-trimethoxysilylethyl) trisulfide, bis(4-trimethoxysilylbutyl)trisulfide, bis(3-triethoxysilylpropyl)disulfide, bis(2-triethoxysilylethyl) disulfide, bis(4-triethoxysilylbutyl)disulfide, bis(3-trimethoxysilylpropyl)disulfide, bis(2-trimethoxysilylethyl) disulfide, bis(4-trimethoxysilylbutyl)disulfide, 3-trimethoxysilylpropyl-N,N-dimethylthiocarbamoyl tetrasulfide, 3-triethoxysilylpropyl-N,N-dimethylthiocarbamoyl tetrasulfide, 2-trimethoxysilylethyl-N,N-dimethylthiocarbamoyl tetrasulfide, 3-trimethoxysilylpropyl benzothiazolyl tetrasulfide, 3-triethoxysilylpropyl benzothiazole tetrasulfide or 3-trimethoxysilylpropyl methacrylate monosulfide, a mercapto-based silane coupling agent such as 3-mercaptopropyl trimethoxysilane, 3-mercaptopropyl triethoxysilane, 2-mercaptoethyl trimethoxysilane or 2-mercaptoethyl triethoxysilane, a vinyl-based silane coupling agent such as vinyl triethoxysilane or vinyl trimethoxysilane, an amino-based silane coupling agent such as 3-aminopropyl triethoxysilane, 3-aminopropyl trimethoxysilane, 3-(2-aminoethyl)aminopropyl triethoxysilane or 3-(2-aminoethyl)aminopropyl trimethoxysilane, a glycidoxy-based silane coupling agent such as γ-glycidoxypropyl triethoxysilane, γ-glycidoxypropyl trimethoxysilane, γ-glycidoxypropylmethyl diethoxysilane or γ-glycidoxypropylmethyl dimethoxysilane, a nitro-based silane coupling agent such as 3-nitropropyl trimethoxysilane or 3-nitropropyl triethoxysilane or a chloro-based silane coupling agent such as 3-chloropropyl trimethoxysilane, 3-chloropropyl triethoxysilane, 2-chloroethyl trimethoxysilane or 2-chloroethyl triethoxysilane, for example. Such a silane coupling agent may be independently employed, or at least two such silane coupling agents may be employed in combination with each other.

In particular, Si69 (bis(3-triethoxysilylpropyl)tetrasulfide) or Si266 (bis(3-triethoxysilylpropyl)disulfide) by Degussa GmbH is preferably employed in view of excellent workability.

The content of the silane coupling agent is preferably at least 1 part by mass, more preferably at least 2 parts by mass with respect to 100 parts by mass of silica. If the content of the silane coupling agent is less than 1 part by mass, the effect of improving the dispersibility etc. tends to be insufficient. Further, the content of the silane coupling agent is preferably not more than 20 parts by mass, more preferably not more than 15 parts by mass with respect to 100 parts by mass of silica. If the content of the silane coupling agent exceeds 20 parts by mass, no sufficient coupling effect is attained but the reinforcing effect and the abrasion resistance tend to reduce.

The rubber composition for a tread according to the present invention may contain carbon black. The BET specific surface area of carbon black is preferably at least 70 $m^2/g$, more preferably at least 80 $m^2/g$. If the BET specific surface area of carbon black is less than 70 $m^2/g$, the reinforcing effect is insufficient. Further, the BET specific surface area of carbon black is preferably not more than 200 $m^2/g$, more preferably not more than 180 $m^2/g$. If the BET specific surface area of carbon black exceeds 200 $m^2/g$, the reinforcing effect tends to reduce.

The DBP (dibutyl phthalate) oil absorption of carbon black is preferably at least 70 ml/100 g, more preferably 80 to 160 ml/100 g. If the DBP oil absorption of carbon black is less than 70 ml/100 g, the reinforcing effect tends to reduce.

If the rubber composition for a tread according to the present invention contains carbon black, the content of carbon black is preferably 5 to 150 parts by mass, more preferably 10 to 120 parts by mass, further preferably 15 to 100 parts by mass with respect to 100 parts by mass of the rubber component. Sufficient reduction of exothermicity and improvement of gripping performance resulting from the addition of carbon black cannot be attained if the content of carbon black is less than 5 parts by mass, while the workability and operability tend to reduce if the content of carbon black exceeds 150 parts by mass. However, the rubber composition for a tread according to the present invention preferably contains no carbon black, in consideration of saving of resources and environmental protection.

(Other Compounding Agents)

The rubber composition for a tread according to the present invention may further contain other additives such as a vulcanizer, a vulcanization accelerator, stearic acid, metallic stearate, oil, cured resin, wax, an antioxidant and the like, for example, generally used in the rubber industry, in addition to the aforementioned components.

An organic peroxide or a sulfur-based vulcanizer can be used as the vulcanizer, for example. The organic peroxide can be prepared from benzoyl peroxide, dicumyl peroxide, di-t-butyl peroxide, t-butylcumyl peroxide, methyl ethyl ketone peroxide, cumene hydroperoxide, 2,5-dimethyl-2,5-di(t-butylperoxy)hexane, 2,5-dimethyl-2,5-di(benzoylperoxy)hexane, 2,5-dimethyl-2,5-di(t-butylperoxy)hexyne-3 or 1,3-bis (t-butylperoxypropyl)benzene, di-t-butylperoxy-diisopropylbenzene, t-butylperoxybenzene, 2,4-dichlorobenzoyl peroxide, 1,1-di-t-butylperoxy-3,3,5-trimethylsiloxane or n-butyl-4,4-di-t-butylperoxy valerate, for example. In particular, dicumyl peroxide, t-butylperoxybenzene or di-t-butylperoxy-diisopropylbenzene is preferable. The sulfur-based vulcanizer can be prepared from sulfur or morpholine disulfide, for example. In particular, sulfur is preferable. Such a vulcanizer can be independently employed, or at least two vulcanizers may be employed in combination with each other. Sulfur may be treated with oil.

The vulcanization accelerator can contain at least one of sulfenamide-based, thiazole-based, thiuram-based, thiourea-based, guanidine-based, dithiocarbamate-based, aldehyde-amine or aldehyde-ammonia-based, imidazoline-based and xanthate-based vulcanization accelerators. The sulfenamide-based vulcanization accelerator can be prepared from CBS (N-cyclohexyl-2-benzothiazyl sulfenamide), TBBS (N-tert-butyl-2-benzothiazyl sulfenamide), N,N-dicyclohexyl-2-benzothiazyl sulfenamide, N-oxydiethylene-2-benzothiazyl sulfenamide or N,N-diisopropyl-2-benzothiazole sulfenamide, for example. The thiazole-based vulcanization accelerator can be prepared from sodium salt, zinc salt, copper salt or cyclohexylamine salt of MBT (2-mercaptobenzothiazole). MBTS (dibenzothiazyl disulfide) or 2-mercaptobenzothiazole or a thiazole-based compound such as 2-(2,4-dinitrophenyl)mercaptobenzothiazole or 2-(2,6-diethyl-4-morpholinothio)benzothiazole, for example. The thiuram-based vulcanization accelerator can be prepared from a thiuram-based compound such as TMTD (tetramethylthiuram disulfide), tetraethylthiraum disulfide, tetramethylthiuram monosulfide, dipentamethylenethiuram disulfide, dipentamethylenethiuram monosulfide, dipentamethylenethiuram tetrasulfide, dipentamethylenethiuram hexasulfide, tetrabutylthiuram disulfide or pentamethylenethiuram tetrasulfide, for example. The thiourea-based vulcanization accelerator can be prepared from thiacarbamide, diethylthiourea, dibutylthiourea, trimethylthiourea or diorthotolylthiourea, for example. The guanidine-based vulcanization accelerator can be prepared from diphenylguanidine, diorthotolylguanidine, triphenylguanidine, orthotolyl biguanide or diphenylguanidine phthalate, for example. The dithiocarbamate-based vulcanization accelerator can be prepared from a dithiocarbamate-based compound such as zinc ethylphenyldithiocarbamate, zinc butylphenyldithiocarbamate, sodium dimethyldithiocarbamate, zinc dimethyldithiocarbamate, zinc diethyldithiocarbamate, zinc dibutyldithiocarbamate, zinc diamyldithiocarbamate, zinc dipropyldithiocarbamate, complex salt of zinc pentamethylenedithiocarbamate and piperidine, zinc hexadecyl (or octadecyl) isopropyldithiocarbamate, zinc dibenzyldithiocarbamate, sodium diethyldithiocarbamate, piperidine pentamethylenedithiocarbamate, selenium dimethyldithiocarbamate, tellurium diethydithiocarbamate or cadmium diamyldithiocarbamate, for example. The aldehyde-amine or aldehyde-ammonia-based vulcanization accelerator can be prepared from an aldehyde-amine or aldehyde-ammonia-based compound such as an acetaldehyde-aniline reactant, a butylaldehyde-aniline condensate, hexamethylene tetramine or an acetaldehyde-ammonia reactant, for example. The imidazoline-based vulcanization accelerator can be prepared from an imidazoline-based compound such as 2-mercaptoimidazoline, for example. The xanthate-based vulcanization accelerator can be prepared from a xanthate-based compound such as zinc dibutylxanthate, for example. Such a vulcanization accelerator may be independently employed, or at least two types of vulcanization accelerators may be employed in combination with each other.

The antioxidant can be properly selected from amine-based, phenol-based imidazole-based and metallic carbamate-based salts.

The rubber composition for a tread according to the present invention may contain metallic stearate. Metallic stearate can be prepared from magnesium stearate, magnesium 12-hydroxystearate, calcium stearate, calcium 12-hydroxystearate, barium stearate, barium 12-hydroxystearate, zinc stearate or zinc 12-hydroxystearate. In particular, metallic stearate is preferably prepared from alkaline earth metal stearate, more preferably from calcium stearate, calcium 12-hydroxystearate, barium stearate or barium 12-hydroxystearate, in consideration of an effect of improving heat resistance and compatibility with the epoxidized natural rubber.

The content of metallic stearate is at least 1 part by mass, preferably at least 1.5 parts by mass with respect to 100 parts by mass of the rubber component. If the content of metallic stearate is less than 1 part by mass, sufficient effects of improving compatibility and heat resistance tend to be unattainable. Further, the content of metallic stearate is not more than 10 parts by mass, preferably not more than 8 parts by mass. If the content of metallic stearate exceeds 10 parts by mass, hardness and moduli are reduced, and the abrasion resistance tends to reduce.

<Rubber Composition for Base Tread>

The rubber composition for a base tread according to the present invention contains 0.1 to 10 parts by mass of the zinc oxide particles having the average particle diameter of not more than 200 nm with respect to 100 parts by mass of the rubber component. This rubber composition for a base tread according to the present invention supplies excellent low rolling resistance (LRR) and high-speed durability to the tire.

(Rubber Component)

At least one rubber component selected from natural rubber (NR), epoxidized natural rubber (ENR), deproteinized natural rubber (DPNR) and other natural-based rubber as well as diene-based synthetic rubber is blended into the rubber composition for a base tread according to the present invention. In particular, the rubber composition for a base tread according to the present invention preferably contains natural rubber (NR) as the rubber component. When the rubber composition for a base tread according to the present invention contains NR, low rolling resistance (LRR) can be improved If the rubber composition for a base tread according to the present invention contains natural rubber (NR), the content of NR in the rubber component can be set to at least about 5 percent by mass, for example. If the rubber composition for a base tread according to the present invention contains natural-based rubber other than NR as the rubber component, however, the content of NR may be smaller than about 5 percent by mass. If the rubber composition for a base tread according to the present invention contains only NR as the natural-based rubber component, on the other hand, the content of NR in the rubber component is preferably at least 90 percent by mass, more preferably at least 95 percent by mass. If the content of NR is less than 90 percent by mass, the ratio of nonpetroleum resources in the rubber composition is reduced.

Further, the content of NR in the natural-based rubber component blended into the rubber composition for a base tread is preferably higher, and can be set to at least 50 percent by mass, for example, more preferably at least 70 percent by mass, further preferably at least 90 percent by mass. The effect of improving low rolling resistance can be further increased by increasing the ratio of NR in the natural-based rubber component. The rubber composition for a base tread according to the present invention may contain only NR as the rubber component. Thus, low rolling resistance is further improved, and excellent steering stability can be attained.

The natural rubber (NR) can be prepared from a material of the grade RSS#3, TSR20 or SIR20, for example, generally employed in the rubber industry.

The rubber composition for a base tread according to the present invention may contain the aforementioned epoxidized natural rubber (ENR) as the rubber component. If the rubber composition for a base tread according to the present invention contains epoxidized natural rubber (ENR), the content of ENR in the rubber component is not particularly limited but can be set to at least about 5 percent by mass, for example. If the rubber composition for a base tread according to the present invention contains natural-based rubber other than ENR as the rubber component, however, the content of ENR may be smaller than about 5 percent by mass. If containing natural-based rubber other than ENR as the rubber component, the rubber composition for a base tread according to the present invention may not contain ENR. If the rubber composition for a base tread according to the present invention contains only ENR as the natural-based rubber component, on the other hand, the content of ENR in the rubber component is preferably at least 90 percent by mass, more preferably at least 95 percent by mass. If the content of ENR is less than 90 percent by mass, the ratio of nonpetroleum resources in the rubber composition is reduced.

The epoxidation ratio of the epoxidized natural rubber (ENR) is preferably at least 5 mole percent, more preferably at least 10 mole percent. If the epoxidation ratio of ENR is less than 5 mole percent, the effect of improving gripping performance tends to reduce. Further, the epoxidation ratio of the epoxidized natural rubber (ENR) is preferably not more than 60 mole percent, more preferably not more than 55 mole percent. If the epoxidation ratio of ENR exceeds 60 mole percent, the strength of the obtained base tread rubber is insufficient, and bondability to general-purpose rubber tends to reduce.

The rubber composition for a base tread according to the present invention may contain the aforementioned deproteinized natural rubber (DPNR) as the rubber component. If the rubber composition for a base tread according to the present invention contains deproteinized natural rubber (DPNR), the content of the deproteinized natural rubber (DPNR) in the rubber component is not particularly limited but can be set to at least about 5 percent by mass, for example. If the rubber composition for a base tread according to the present invention contains natural-based rubber other than DPNR as the rubber component, however, the content of DPNR may be smaller than about 5 percent by mass. If containing natural-based rubber other than DPNR as the rubber component, the rubber composition for a base tread according to the present invention may not contain DPNR. If the rubber composition for a base tread according to the present invention contains only DPNR as the natural-based rubber component, on the other hand, the content of DPNR in the rubber component is preferably at least 90 percent by mass, more preferably at least 95 percent by mass. If the content of DPNR is less than 90 percent by mass, the ratio of nonpetroleum resources in the rubber composition is reduced. DPNR is prepared by the aforementioned method.

The rubber composition for a base tread according to the present invention may contain other modified natural rubber than the above or diene-based synthetic rubber. The diene-based synthetic rubber can be prepared from styrene-butadiene rubber (SBR), butadiene rubber (BR), styrene-isoprene copolymer rubber, isoprene rubber (IR), isobutylene-isoprene rubber (IIR), chloroprene rubber (CR), acrylonitrile-butadiene rubber (NBR), halogenated isobutylene-isoprene rubber (X-IIR) or a halide of a copolymer of isobutylene and p-methylstyrene, for example.

If the rubber composition for a base tread according to the present invention contains diene-based synthetic rubber, the content of the diene-based synthetic rubber in the rubber component is preferably set to not more than 10 percent by mass. The rubber composition for a base tread according to the present invention more preferably contains no diene-based synthetic rubber, in order to increase the content of nonpetroleum resources in consideration of saving of resources and environmental protection.

(Zinc Oxide)

The rubber composition for a base tread according to the present invention contains the zinc oxide particles having the average particle diameter of not more than 200 nm. Zinc oxide is blended into the rubber composition for a base tread according to the present invention as a supplement vulcanization accelerator. When the rubber composition for a base tread according to the present invention contains the zinc oxide particles having the average particle diameter of not more than 200 nm, breakage of rubber resulting from zinc oxide can be effectively prevented and high-speed durability of the obtained base tread rubber can be improved. When the rubber composition for a base tread according to the present invention contains the zinc oxide particles having the average particle diameter of not more than 200 nm, further, rolling resistance can be improved. If the average particle diameter of the zinc oxide particles exceeds 200 nm, the particles may serve as base points of breakage of rubber, and the high-speed durability and the low rolling resistance of the obtained base tread rubber cannot be sufficiently improved. In order to further improve the high-speed durability and the low rolling resistance, the average particle diameter of the zinc oxide particles is preferably not more than 150 nm, more preferably not more than 100 nm. Further, the average particle diameter of the zinc oxide particles is preferably at least 1 nm, more preferably at least 10 nm. If the average particle diameter of the zinc oxide particles is less than 1 nm, zinc oxide tends to be inferior in dispersibility into the rubber composition.

The content of the zinc oxide particles having the average particle diameter of not more than 200 nm is at least 0.1 parts by mass, preferably at least 0.5 parts by mass, more preferably at least 1.0 part by mass with respect to 100 parts by mass of the rubber component. If the content of the zinc oxide particles having the average particle diameter of not more than 200 nm is less than 0.1 parts by mass, the effect of zinc oxide serving as a supplement vulcanization accelerator tends to be hardly attainable. Further, the content of the zinc oxide particles having the average particle diameter of not more than 200 nm is not more than 10 parts by mass, preferably not more than 5 parts by mass with respect to 100 parts by mass of the rubber component. If the content of the zinc oxide particles having the average particle diameter of not more than 200 nm exceeds 10 parts by mass, the abrasion resistance tends to reduce.

The rubber composition for a base tread according to the present invention may further contain zinc oxide particles having an average particle diameter of at least 200 nm along with the zinc oxide particles having the average particle diameter of not more than 200 nm. However, the content of the zinc oxide particles having the average particle diameter of at least 200 nm is preferably not more than 2.5 parts by mass, more preferably not more than 1.5 parts by mass with respect to 100 parts by mass of the rubber component. If the content of the zinc oxide particles having the average particle diameter of at least 200 nm exceeds 2.5 parts by mass, the abrasion resistance tends to deteriorate. If the rubber composition for a base tread according to the present invention further contains the zinc oxide particles having the average particle diameter of at least 200 nm, the ratio (mass ratio) of the zinc oxide particles having the average particle diameter of at least 200 nm to the zinc oxide particles having the average particle diameter of not more than 200 nm is preferably not more than 5, more preferably not more than 3. If this ratio exceeds 5, the abrasion resistance tends to deteriorate.

The rubber composition for a base tread according to the present invention preferably further contains silica. Silica functions as a reinforcing filler, and the abrasion resistance of the obtained base tread rubber can be improved by blending silica into the rubber composition for a base tread.

Silica may be prepared either by a wet method or by a dry method.

The BET specific surface area of silica is preferably at least 100 $m^2/g$, more preferably at least 120 $m^2/g$. If the BET specific surface area of silica is less than 100 $m^2/g$, the reinforcing effect is insufficient. Further, the BET specific surface area of silica is preferably not more than 300 $m^2/g$, more preferably not more than 280 $m^2/g$. If the BET specific surface area of silica exceeds 300 $m^2/g$, knitting performance of rubber is inferior and the obtained base tread rubber tends to cause a broken sheet.

If the rubber composition for a base tread according to the present invention contains silica, the content of silica is preferably at least 30 parts by mass, more preferably at least 33 parts by mass with respect to 100 parts by mass of the rubber component. If the content of silica is less than 30 parts by mass, a sufficient effect of improving high-speed durability tends to be unattainable. Further, the content of silica is preferably not more than 50 parts by mass, more preferably not more than 40 parts by mass with respect to 100 parts by mass of the rubber component. If the content of silica exceeds 50 parts by mass, a sufficient effect of improving rolling resistance tends to be unattainable.

When containing silica, the rubber composition for a base tread according to the present invention preferably contains a silane coupling agent along with silica. The type and the content of the silane coupling agent employed for the rubber composition for a base tread according to the present invention are similar to those of the silane coupling agent employed for the rubber composition for a tread according to the present invention.

The rubber composition for a base tread according to the present invention may contain carbon black. The BET specific surface area of carbon black is preferably at least 60 $m^2/g$, more preferably at least 70 $m^2/g$. If the BET specific surface area of carbon black is less than 60 $m^2/g$, the reinforcing effect is reduced. Further, the BET specific surface area of carbon black is preferably not more than 200 $m^2/g$, more preferably not more than 180 $m^2/g$. If the BET specific surface area of carbon black exceeds 200 $m^2/g$, the reinforcing effect tends to reduce.

The DBP (dibutyl phthalate) oil absorption of carbon black is preferably at least 70 ml/100 g, more preferably 80 to 160 ml/100 g. If the DBP oil absorption is less than 70 ml/100 g, the reinforcing effect tends to reduce.

If the rubber composition for a base tread according to the present invention contains carbon black, the content of carbon black is preferably 5 to 150 parts by mass, more preferably 10 to 120 parts by mass, further preferably 15 to 100 parts by mass with respect to 100 parts by mass of the rubber component. Sufficient improvement of rolling resistance resulting from the addition of carbon black cannot be attained if the content of carbon black is less than 5 parts by mass, while the workability and operability tend to reduce if the content of carbon black exceeds 150 parts by mass. However, the rubber composition for a base tread according to the present invention preferably contains no carbon black, in consideration of saving of resources and environmental protection.

The rubber composition for a base tread according to the present invention may further contain other additives such as a vulcanizer, a vulcanization accelerator, stearic acid, metallic stearate, oil, cured resin, wax, an antioxidant and the like, for example, generally used in the rubber industry, similarly to the rubber composition for a tread.

<Rubber Composition for Bead Apex>

The rubber composition for a bead apex according to the present invention contains 0.1 to 10 parts by mass of the zinc oxide particles having the average particle diameter of not more than 200 nm with respect to 100 parts by mass of the rubber component. This rubber composition for a bead apex according to the present invention supplies excellent rigidity, particularly excellent tensile strength and flex cracking resistance to the tire.

(Rubber Component)

The rubber composition for a bead apex according to the present invention contains at least natural rubber (NR) as the rubber component. The content of natural rubber (NR) in the rubber component is preferably at least 50 percent by mass, more preferably at least 80 percent by mass, further preferably at least 90 percent by mass. The content of natural rubber is particularly preferably 100 percent by mass, i.e., the rubber composition for a bead apex according to the present invention particularly preferably contains only natural rubber as the rubber component. High hardness, high durability, excellent fatigue resistance and excellent rolling resistance can be supplied due to the employment of natural rubber (NR), and the tensile strength can be advantageously increased as the content of natural rubber (NR) in the rubber component is increased.

The natural rubber (NR) can be prepared from a material of the grade RSS#3, TSR20 or SIR20, for example, generally employed in the rubber industry.

The rubber composition for a bead apex according to the present invention may contain a rubber component other than natural rubber. The rubber component other than natural rubber can be prepared from epoxidized natural rubber (ENR), styrene-butadiene rubber (SBR), butadiene rubber (BR), styrene-isoprene copolymer rubber, isoprene rubber (IR), isobutylene-isoprene rubber (IIR), chloroprene rubber (CR), acrylonitrile-butadiene rubber (NBR), halogenated isobutylene-isoprene rubber (X-IIR) or a halide of a copolymer of isobutylene and p-methylstyrene, for example. In particular, ENR, SBR, BR or IR capable of supplying high hardness and durability as well as excellent fatigue resistance and rolling resistance is preferable, and ENR is more preferable in consideration of protection of petroleum resources.

If the rubber composition for bead apex contains the rubber component other than natural rubber, the content of the rubber component other than the natural rubber in the rubber component is so set that the content of the natural rubber (NR) is in the aforementioned preferable range.

If the rubber composition for a bead apex according to the present invention contains epoxidized natural rubber (ENR), the epoxidation ratio of the epoxidized natural rubber (ENR) is preferably at least 5 mole percent, more preferably at least 10 mole percent. If the epoxidation ratio of ENR is less than 5 mole percent, the glass transition temperature of ENR is so low that effects of improving hardness, durability, fatigue resistance and rolling resistance tend to be hardly attainable.

Further, the epoxidation ratio of the epoxidized natural rubber (ENR) is preferably not more than 65 mole percent, more preferably not more than 60 mole percent. If the epoxidation ratio of ENR exceeds 65 mole percent, hardness is excessively increased, and flex cracking resistance tends to reduce.

If the rubber composition for a bead apex according to the present invention contains natural rubber (NR) and epoxidized natural rubber (ENR), the total content of NR and ENR in the rubber component is preferably at least 50 percent by mass, more preferably at least 80 percent by mass, further preferably at least 90 percent by mass. If the total content of NR and ENR in the rubber component is less than 50 percent by mass, sufficient hardness and durability as well as excellent fatigue resistance and rolling resistance tend to be hardly attainable. The total content of NR and ENR in the rubber component is particularly preferably set to 100 percent by mass, in order to increase the content of nonpetroleum resources.

(Zinc Oxide)

The rubber composition for a bead apex according to the present invention contains the zinc oxide particles having the average particle diameter of not more than 200 nm. When zinc oxide is blended into the rubber composition for a bead apex as a supplement vulcanization accelerator, cracking resulting from zinc oxide can be effectively prevented and flex cracking resistance of the obtained bead apex rubber can be improved when the rubber composition for a bead apex according to the present invention contains the zinc oxide particles having the average particle diameter of not more than 200 nm. If the average particle diameter of the zinc oxide particles exceeds 200 nm, the particles may serve as base points of cracking, and the obtained bead apex rubber is inferior in flex cracking resistance. In order to further improve the flex cracking resistance, the average particle diameter of the zinc oxide particles is preferably not more than 150 nm, more preferably not more than 100 nm. Further, the average particle diameter of the zinc oxide particles is preferably at least 1 nm, more preferably at least 10 nm. If the average particle diameter of the zinc oxide particles is less than 1 nm, zinc oxide tends to be inferior in dispersibility into the rubber composition.

The content of the zinc oxide particles is at least 0.1 parts by mass, preferably at least 1 part by mass, more preferably at least 3 parts by mass with respect to 100 parts by mass of the rubber component. If the content of the zinc oxide particles is less than 0.1 parts by mass, the effect of zinc oxide serving as a supplement vulcanization accelerator tends to be hardly attainable. Further, the content of the zinc oxide particles is not more than 10 parts by mass, preferably not more than 8 parts by mass with respect to 100 parts by mass of the rubber component. If the content of the zinc oxide particles exceeds 10 parts by mass, the flex cracking resistance tends to reduce. The content of the zinc oxide particles is most preferably in the range of 3 to 8 parts by mass with respect to 100 parts by mass of the rubber component, and bead apex rubber excellent in both of tensile strength and flex cracking resistance can be obtained if the content of the zinc oxide particles is in this range.

The rubber composition for a bead apex according to the present invention preferably further contains silica. Silica functions as a reinforcing filler, and the abrasion resistance of the obtained bead apex rubber can be improved by blending silica into the rubber composition for a bead apex.

Silica may be prepared either by a wet method or by a dry method.

The BET specific surface area of silica is preferably at least 70 $m^2/g$, more preferably at least 80 $m^2/g$. If the BET specific surface area of silica is less than 70 $m^2/g$, sufficient hardness tends to be unattainable for the obtained bead apex rubber. Further, the BET specific surface area of silica is preferably not more than 200 $m^2/g$, more preferably not more than 180 $m^2/g$. If the BET specific surface area of silica exceeds 200 $m^2/g$, workability of rubber tends to reduce.

If the rubber composition for a bead apex according to the present invention contains silica, the content of silica is at least 15 parts by mass, preferably at least 30 parts by mass with respect to 100 parts by mass of the rubber component. If the content of silica is less than 15 parts by mass, sufficient hardness, particularly sufficient tensile strength tends to be unattainable for the bead apex rubber. Further, the content of silica is not more than 90 parts by mass, preferably not more than 80 parts by mass with respect to 100 parts by mass of the rubber component. If the content of silica exceeds 90 parts by mass, workability of the rubber is reduced, and heat generation of rubber tends to increase during traveling.

When containing silica, the rubber composition for a bead apex according to the present invention preferably contains a silane coupling agent along with silica. The type of the silane coupling agent employable for the rubber composition for a bead apex according to the present invention is similar to that in the rubber composition for a tread according to the present invention.

The content of the silane coupling agent is preferably at least 2 parts by mass, more preferably at least 3 parts by mass with respect to 100 parts by mass of silica. If the content of the silane coupling agent is less than 2 parts by mass, kneadability and extrudability of rubber tend to reduce, and flex cracking resistance also tends to reduce. Further, the content of the silane coupling agent is preferably not more than 20 parts by mass, more preferably not more than 15 parts by mass with respect to 100 parts by mass of silica. If the content of the silane coupling agent exceeds 20 parts by mass, the effects of improving kneadability and extrudability of rubber are reduced, while the cost is uneconomically increased. If the content of the silane coupling agent exceeds 20 parts by mass, the flex cracking resistance tends to reduce.

While the rubber composition for a bead apex according to the present invention may contain carbon black as a reinforcing filler, the content of carbon black is preferably minimized in consideration of saving of resources and environmental protection. The rubber composition for a bead apex according to the present invention more preferably contains no carbon black.

The rubber composition for a bead apex according to the present invention may further contain other additives such as a vulcanizer, a vulcanization accelerator, stearic acid, metallic stearate, oil, cured resin, wax, an antioxidant and the like, for example, generally used in the rubber industry, similarly to the rubber composition for a tread.

The cured resin employable for the rubber composition for a bead apex according to the present invention can be prepared from phenol-based cured resin, cresol-based cured resin or the like. More preferably, phenol-based cured resin is employed. The phenol-based cured resin can be prepared from alkylphenol resin, oil modified phenol resin, cashew modified phenol resin or the like.

The content of cured resin is preferably 1 to 20 parts by mass with respect to 100 parts by mass of the rubber component. If the content of cured resin is less than 1 part by mass, sufficient hardness tends to be unattainable for the bead apex rubber. If the content of cured resin exceeds 20 parts by mass, unvulcanized rubber is excessively hardened, and workability tends to reduce.

<Rubber Composition for Clinch>

The rubber composition for a clinch according to the present invention contains 0.1 to 10 parts by mass of the zinc oxide particles having the average particle diameter of not more than 200 nm with respect to 100 parts by mass of the rubber component. This rubber composition for a clinch according to the present invention supplies excellent tensile strength and abrasion resistance to the tire.

(Rubber Component)

The rubber composition for a clinch according to the present invention contains at least natural rubber (NR) and epoxidized natural rubber.

The natural rubber (NR) can be prepared from a material of the grade RSS#3, TSR20 or SIR20, for example, generally employed in the rubber industry.

The content of natural rubber (NR) in the rubber component is at least 30 percent by mass, preferably at least 40 percent by mass. If the content of NR is less than 30 percent by mass, rubber strength is insufficient. Further, the content of natural rubber (NR) in the rubber component is not more than 90 percent by mass, preferably not more than 80 percent by mass. If the content of NR exceeds 90 percent by mass, the abrasion resistance is insufficiently improved.

The content of epoxidized natural rubber (ENR) in the rubber component is at least 10 percent by mass, preferably at least 20 percent by mass. If the content of ENR is less than 10 percent by mass, the abrasion resistance is insufficiently improved. Further, the content of epoxidized natural rubber (ENR) in the rubber component is not more than 70 percent by mass, preferably not more than 50 percent by mass. If the content of ENR exceeds 70 percent by mass, rubber strength is insufficient.

The epoxidation ratio of epoxidized natural rubber (ENR) is preferably at least 5 mole percent, more preferably at least 10 mole percent. If the epoxidation ratio of ENR is less than 5 mole percent, the glass transition temperature of ENR is so low that high hardness and durability as well as excellent fatigue resistance and rolling resistance tend to be hardly attainable. Further, the epoxidation ratio of the epoxidized natural rubber (ENR) is preferably not more than 65 mole percent, more preferably not more than 60 mole percent. If the epoxidation ratio of ENR exceeds 65 mole percent, rubber hardness tends to be insufficient.

The rubber composition for a clinch according to the present invention may contain a rubber component other than natural rubber and epoxidized natural rubber. The rubber component other than natural rubber and epoxidized natural rubber can be prepared from styrene-butadiene rubber (SBR), butadiene rubber (BR), styrene-isoprene copolymer rubber, isoprene rubber (IR), isobutylene-isoprene rubber (IIR), chloroprene rubber (CR), acrylonitrile-butadiene rubber (NBR), halogenated isobutylene-isoprene rubber (X-IIR) or a halide of a copolymer of isobutylene and p-methylstyrene, for example. In particular, SBR, BR or IR capable of supplying high hardness and durability as well as excellent fatigue resistance and rolling resistance is preferable.

If the rubber composition for a clinch according to the present invention contains the rubber component other than natural rubber and epoxidized natural rubber, the content of the rubber component other than natural rubber and epoxidized natural rubber is preferably not more than 20 percent by mass. The rubber composition for a clinch according to the present invention more preferably contains no rubber component other than natural rubber and epoxidized natural rubber, in order to increase the content of nonpetroleum resources in consideration of saving of resources and environmental protection.

(Zinc Oxide)

The rubber composition for a clinch according to the present invention contains the zinc oxide particles having the average particle diameter of not more than 200 nm. Zinc oxide is blended into the rubber composition for a clinch according to the present invention as a supplement vulcanization accelerator. When the rubber composition for a clinch according to the present invention contains the zinc oxide particles having the average particle diameter of not more than 200 nm, cracking resulting from zinc oxide can be effectively prevented, strength and abrasion resistance of the obtained clinch rubber are improved, and flex cracking resistance can be improved. If the average particle diameter of the zinc oxide particles exceeds 200 nm, the particles may serve as base points of cracking, the obtained clinch rubber is inferior in flex cracking resistance, and the strength and the abrasion resistance of the clinch rubber are insufficiently improved. In order to further improve the flex cracking resistance, the average particle diameter of the zinc oxide particles is preferably not more than 150 nm, more preferably not more than 100 nm. Further, the average particle diameter of the zinc oxide particles is preferably at least 1 nm, more preferably at least 10 nm. If the average particle diameter of the zinc oxide particles is less than 1 nm, zinc oxide tends to be inferior in dispersibility into the rubber composition.

The content of the zinc oxide particles is at least 0.1 parts by mass, preferably at least 1 part by mass, more preferably at least 3 parts by mass with respect to 100 parts by mass of the rubber component. If the content of the zinc oxide particles is less than 0.1 parts by mass, the effect of zinc oxide serving as a supplement vulcanization accelerator tends to be hardly attainable. Further, the content of the zinc oxide particles is not more than 10 parts by mass, preferably not more than 8 parts by mass with respect to 100 parts by mass of the rubber component. If the content of the zinc oxide particles exceeds 10 parts by mass, the flex cracking resistance tends to reduce. The content of the zinc oxide particles is most preferably in the range of 3 to 8 parts by mass with respect to 100 parts by mass of the rubber component, and clinch rubber excellent in tensile strength, abrasion resistance and flex cracking resistance can be obtained if the content of the zinc oxide particles is in this range.

The rubber composition for a clinch according to the present invention preferably further contains silica. Silica functions as a reinforcing filler, and the tensile strength of the obtained clinch rubber can be improved by blending silica into the rubber composition for a clinch.

Silica may be prepared either by a wet method or by a thy method.

The BET specific surface area of silica is preferably at least 70 m$^2$/g, more preferably at least 80 m$^2$/g. If the BET specific surface area of silica is less than 70 m$^2$/g, sufficient strength tends to be unattainable for the clinch rubber. Further, the BET specific surface area of silica is preferably not more than 200 m$^2$/g, more preferably not more than 180 m$^2$/g. If the BET specific surface area of silica exceeds 200 m$^2$/g, workability of the rubber tends to increase.

If the rubber composition for a clinch according to the present invention contains silica, the content of silica is at least 15 parts by mass, preferably at least 30 parts by mass with respect to 100 parts by mass of the rubber component. If the content of silica is less than 15 parts by mass, sufficient strength, particularly sufficient tensile strength tends to be unattainable for the clinch rubber. Further, the content of silica is not more than 90 parts by mass, preferably not more than 80 parts by mass with respect to 100 parts by mass of the rubber component. If the content of silica exceeds 90 parts by mass, workability of the rubber is reduced, and heat generation of rubber tends to increase during traveling.

When containing silica, the rubber composition for a clinch according to the present invention preferably contains a silane coupling agent along with silica. The type of the silane coupling agent employable for the rubber composition for a clinch according to the present invention is similar to that in the rubber composition for a tread according to the present invention.

The content of the silane coupling agent is preferably at least 2 parts by mass, more preferably at least 3 parts by mass with respect to 100 parts by mass of silica. If the content of silica is less than 2 parts by mass, rubber strength tends to reduce. Further, the content of the silane coupling agent is preferably not more than 20 parts by mass, more preferably not more than 18 parts by mass with respect to 100 parts by mass of silica. If the content of the silane coupling agent exceeds 20 parts by mass, the effects of improving kneadability and extrudability of rubber are reduced, while the cost is uneconomically increased. If the content of the silane coupling agent exceeds 20 parts by mass, the strength tends to reduce.

While the rubber composition for a clinch according to the present invention may contain carbon black as a reinforcing filler, the content of carbon black is preferably minimized in consideration of saving of resources and environmental protection. The rubber composition for a clinch according to the present invention more preferably contains no carbon black.

The rubber composition for a clinch according to the present invention may further contain other additives such as a vulcanizer, a vulcanization accelerator, stearic acid, metallic stearate, oil, cured resin, wax, an antioxidant and the like, for example, generally used in the rubber industry, similarly to the rubber composition for a tread.

<Rubber Composition for Inner Liner>

The rubber composition for an inner liner according to the present invention contains 0.1 to 10 parts by mass of the zinc oxide particles having the average particle diameter of not more than 200 nm with respect to 100 parts by mass of the rubber component. This rubber composition for an inner liner according to the present invention supplies excellent air permeation resistance and flex cracking resistance to the tire.

(Rubber Component)

At least one rubber component selected from natural rubber (NR), epoxidized natural rubber (ENR), deproteinized natural rubber (DPNR) and other natural-based rubber as well as diene-based synthetic rubber is blended into the rubber composition for an inner liner according to the present invention. In particular, the rubber composition for an inner liner according to the present invention preferably contains epoxidized natural rubber (ENR) as the rubber component.

The epoxidation ratio of epoxidized natural rubber (ENR) is preferably at least 5 mole percent, more preferably at least 10 mole percent. If the epoxidation ratio of ENR is less than 5 mole percent, a gas retention property tends to be inferior. Further, the epoxidation ratio of epoxidized natural rubber (ENR) is preferably not more than 60 mole percent, more preferably not more than 55 mole percent. If the epoxidation ratio of ENR exceeds 60 mole percent, heat resistance and durability tend to be inferior.

If the rubber composition for an inner liner according to the present invention contains epoxidized natural rubber (ENR), the content of ENR in the rubber component can be set to at least about 5 percent by mass, for example. If the rubber composition for an inner liner according to the present invention contains natural-based rubber other than NR as the rubber component, however, the content of ENR may be smaller than about 5 percent by mass. If the rubber composition for an inner liner according to the present invention contains only ENR as the natural-based rubber component, on the other hand, the ENR content in the rubber component is preferably at least 90 percent by mass, more preferably at least 95 percent by mass. If the content of ENR is less than 90 percent by mass, the ratio of nonpetroleum resources in the rubber composition is reduced.

The ratio of ENR in the natural-based rubber component blended into the rubber composition is preferably higher, and can be set to at least 50 percent by mass, for example, more preferably at least 70 percent by mass, further preferably at least 90 percent by mass. The gas retention property can be more improved by increasing the ratio of ENR in the natural-based rubber component. The rubber composition for an inner liner according to the present invention may contain only ENR as the rubber component. Thus, the gas retention property can be further improved.

The rubber composition for an inner liner according to the present invention may contain natural rubber (NR) as the rubber component. The natural rubber (NR) can be prepared from a material of the grade RSS#3, TSR20 or SIR20, for example, generally employed in the rubber industry.

If the rubber composition for an inner liner according to the present invention contains natural rubber (NR), the content of NR in the rubber component is not particularly limited but can be set to at least about 5 percent by mass, for example. If the rubber composition for an inner liner according to the present invention contains natural-based rubber other than NR as the rubber component, however, the content of NR may be smaller than about 5 percent by mass. If containing natural-based rubber other than NR as the rubber component, the rubber composition for an inner liner according to the present invention may not contain NR. If the rubber composition for an inner liner according to the present invention contains only NR as the natural-based rubber component, on the other hand, the content of NR in the rubber component is preferably at least 90 percent by mass, more preferably at least 95 percent by mass. If the content of NR is less than 90 percent by mass, the ratio of nonpetroleum resources in the rubber composition is reduced.

The rubber composition for an inner liner according to the present invention may contain the aforementioned deproteinized natural rubber (DPNR) as the rubber component. If the rubber composition for an inner liner according to the present invention contains deproteinized natural rubber (DPNR), the content of deproteinized natural rubber (DPNR) in the rubber component is not particularly limited but can be set to at least about 5 percent by mass, for example. If the rubber composition for an inner liner according to the present invention contains natural-based rubber other than DPNR as the rubber component, however, the content of DPNR may be smaller than about 5 percent by mass. If containing natural-based rubber other than DPNR as the rubber component, the rubber composition for an inner liner according to the present invention may not contain DPNR. If the rubber composition for an inner liner according to the present invention contains only DPNR as the natural-based rubber component, on the other hand, the content of DPNR in the rubber component is preferably at least 90 percent by mass, more preferably at least 95 percent by mass. If the content of DPNR is less than 90 percent by mass, the ratio of nonpetroleum resources in the rubber composition is reduced. DPNR is prepared by the aforementioned method.

The rubber composition for an inner liner according to the present invention may contain other modified natural rubber than the above or diene-based synthetic rubber. The diene-based synthetic rubber can be prepared from styrene-butadiene rubber (SBR), butadiene rubber (BR), styrene-isoprene copolymer rubber, isoprene rubber (IR), isobutylene-isoprene rubber (IIR), chloroprene rubber (CR), acrylonitrile-butadiene rubber (NBR), halogenated isobutylene-isoprene rubber (X-IIR) or a halide of a copolymer of isobutylene and p-methylstyrene, for example.

If the rubber composition for an inner liner according to the present invention contains diene-based synthetic rubber, the content of the diene-based synthetic rubber in the rubber component is preferably set to not more than 10 percent by mass. The rubber composition for an inner liner according to the present invention more preferably contains no diene-based synthetic rubber, in order to increase the content of nonpetroleum resources in consideration of saving of resources and environmental protection.

(Zinc Oxide)

The rubber composition for an inner liner according to the present invention contains the zinc oxide particles having the average particle diameter of not more than 200 nm. Zinc oxide is blended into the rubber composition for an inner liner according to the present invention as a supplement vulcanization accelerator. When the rubber composition for an inner liner according to the present invention contains the zinc oxide particles having the average particle diameter of not more than 200 nm, breakage of rubber resulting from zinc oxide can be effectively prevented, and air permeation resistance of the obtained inner liner rubber can be improved. When the rubber composition for an inner liner according to the present invention contains the zinc oxide particles having the average particle diameter of not more than 200 nm, further, flex cracking resistance can be improved. If the average particle diameter of the zinc oxide particles exceeds 200 nm, the particles may serve as base points of breakage of rubber, and the air permeation resistance and flex cracking resistance of the obtained inner liner rubber cannot be sufficiently improved. In order to further improve the air permeation resistance and flex cracking resistance, the average particle diameter of the zinc oxide particles is preferably not more than 150 nm, more preferably not more than 100 nm. Further, the average particle diameter of the zinc oxide particles is preferably at least 1 nm, more preferably at least 10 nm. If the average particle diameter of the zinc oxide particles is less than 1 nm, zinc oxide tends to be inferior in dispersibility into the rubber composition.

The content of the zinc oxide particles having the average particle diameter of not more than 200 nm is at least 0.1 parts by mass, preferably at least 0.5 parts by mass, more preferably at least 1.0 part by mass with respect to 100 parts by mass of the rubber component. If the content of the zinc oxide particles having the average particle diameter of not more than 200 nm is less than 0.1 parts by mass, the effect of zinc oxide serving as a supplement vulcanization accelerator tends to be hardly attainable. Further, the content of the zinc oxide particles having the average particle diameter of not more than 200 nm is not more than 10 parts by mass, preferably not more than 5 parts by mass with respect to 100 parts by mass of the rubber component. If the content of the zinc oxide particles having the average particle diameter of not more than 200 nm exceeds 10 parts by mass, the flex cracking resistance tends to reduce.

The rubber composition for an inner liner according to the present invention may further contain zinc oxide particles having an average particle diameter of at least 200 nm along with the zinc oxide particles having the average particle diameter of not more than 200 nm. However, the content of the zinc oxide particles having the average particle diameter of at least 200 nm is preferably not more than 2.5 parts by mass, more preferably not more than 1.5 parts by mass with respect to 100 parts by mass of the rubber component. If the content of the zinc oxide particles having the average particle diameter of at least 200 nm exceeds 2.5 parts by mass, the flex cracking resistance tends to be inferior. If the rubber composition for an inner liner according to the present invention further contains the zinc oxide particles having the average particle diameter of at least 200 nm, the ratio (mass ratio) of the zinc oxide particles having the average particle diameter of at least 200 nm to the zinc oxide particles having the average particle diameter of not more than 200 nm is preferably not more than 5, more preferably not more than 3. If this ratio exceeds 5, the flex cracking resistance tends to be inferior.

The rubber composition for an inner liner according to the present invention preferably further contains silica. Silica functions as a reinforcing filler, and the air permeation resistance and flex cracking resistance of the obtained inner liner rubber can be further improved by blending silica into the rubber composition for an inner liner.

Silica may be prepared either by a wet method or by a dry method.

The BET specific surface area of silica is preferably at least 150 $m^2/g$, more preferably at least 170 $m^2/g$. If the BET specific surface area of silica is less than 150 $m^2/g$, sufficient flex cracking resistance tends to be hardly attainable. Further, the BET specific surface area of silica is preferably not more than 200 $m^2/g$, more preferably not more than 180 $m^2/g$. If the BET specific surface area of silica exceeds 200 $m^2/g$, the viscosity of unvulcanized rubber tends to excessively increase.

If the rubber composition for an inner liner according to the present invention contains silica, the content of silica is preferably at least 30 parts by mass, more preferably at least 33 parts by mass with respect to 100 parts by mass of the rubber component. If the content of silica is less than 30 parts by mass, a sufficient effect of improving air permeation resistance tends to be unattainable. Further, the content of silica is preferably not more than 50 parts by mass, more preferably not more than 40 parts by mass with respect to 100 parts by mass of the rubber component. If the content of silica exceeds 50 parts by mass, the flex cracking resistance tends to reduce.

When containing silica, the rubber composition for an inner liner according to the present invention preferably contains a silane coupling agent along with silica. The type of the silane coupling agent employed for the rubber composition for an inner liner according to the present invention is similar to that of the silane coupling agent employed for the rubber composition for a tread according to the present invention.

The content of the silane coupling agent is preferably at least 1 part by mass, more preferably at least 2 parts by mass with respect to 100 parts by mass of silica. If the content of the silane coupling agent is less than 1 part by mass, an effect of improving dispersibility etc. tends to be insufficiently attained. Further, the content of the silane coupling agent is preferably not more than 20 parts by mass, more preferably not more than 15 parts by mass with respect to 100 parts by mass of silica. If the content of the silane coupling agent exceeds 20 parts by mass, no sufficient coupling effect is attained, and reinforcibility and abrasion resistance tend to reduce.

The rubber composition for an inner liner according to the present invention may contain carbon black. The BET specific surface area of carbon black is preferably at least 20 $m^2/g$, more preferably at least 25 $m^2/g$. If the BET specific surface area of carbon black is less than 20 $m^2/g$, the effect of improving flex cracking resistance tends to be hardly attainable. Further, the BET specific surface area of carbon black is preferably not more than 40 m²/g, more preferably not more than 30 m²/g. If BET specific surface area of carbon black exceeds 40 m²/g, the rolling resistance of the tire tends to increase.

The DBP (dibutyl phthalate) oil absorption of carbon black is preferably at least 70 to 100 ml/100 g, more preferably 80 to 90 ml/100 g. The viscosity of unvulcanized rubber is low and rubber residual tends to be inferior if the DBP oil absorption is less than 70 ml/100 g, while the viscosity of unvulcanized rubber is so high that burnt deposits are easily formed if the DBP oil absorption exceeds 100 ml/100 g.

The content of carbon black is preferably 0 to 10 parts by mass, more preferably 0 to 5 parts by mass, further preferably 0 to 1 part by mass with respect to 100 parts by mass of the rubber component. If the content of carbon black exceeds 10 parts by mass, the ratio of nonpetroleum resources is reduced. The rubber composition for an inner liner according to the present invention preferably contains no carbon black, in consideration of saving of resources and environmental protection.

The rubber composition for an inner liner according to the present invention may further contain other additives such as a vulcanizer, a vulcanization accelerator, stearic acid, metallic stearate, oil, cured resin, wax, an antioxidant and the like, for example, generally used in the rubber industry, similarly to the rubber composition for a tread.

A pneumatic tire according to the present invention is now described. FIG. 1 is a schematic sectional view showing an exemplary pneumatic tire according to the present invention.

The pneumatic tire 1 shown in FIG. 1 comprises a tread portion 2 including a cap tread portion 2a and a base tread portion 2b, a pair of sidewall portions 3 radially inwardly extending from both ends of tread portion 2 and bead portions 4 located on inner ends of sidewall portions 3 respectively. A carcass 6 is extended between bead portions 4, while a belt layer 7 having a hoop effect for reinforcing tread portion 2 is arranged on the outer side of carcass 6 and on the inner side of tread portion 2.

Carcass 6 is formed by at least one carcass ply prepared by arranging carcass cords at an angle of 70 to 90°, for example, with respect to a tire equator CO, and this carcass ply is folded outward from inside along the tire axis direction around bead cores 5 of bead portions 4 from tread portion 2 through sidewall portions 3.

Belt layer 7 is formed by at least two belt plies prepared by arranging belt cords at an angle of not more than 40°, for example, with respect to tire equator CO, and the belt cords are superposed alternately in opposite directions to intersect with each other between the plies.

Bead apex rubber 8 radially extending outward from each bead core 5 is arranged on each bead portion 4, while inner liner rubber 9 forming the inner surface of the tire is provided adjacently to the inner side of carcass 6, and the outer side of carcass 6 is protected with clinch rubber 4G and sidewall rubber 3G.

In pneumatic tire 1 according to the present invention, at least one of cap tread portion 2a, base tread portion 2b, bead apex rubber 8, clinch rubber 4G and sidewall rubber 3G is constituted of the rubber composition according to the present invention. At least two of these portions are preferably constituted of the rubber composition according to the present invention, and all of these portions are particularly preferably constituted of the rubber composition according to the present invention.

The pneumatic tire according to the present invention has a high content of materials consisting of nonpetroleum resources, is prepared with due consideration of saving of resources and environmental protection, and exhibits excellent performance. Therefore, the pneumatic tire according to the present invention can be suitably applied to a passenger car, for example, as an earth-friendly "eco-tire".

The pneumatic tire according to the present invention can be manufactured by a well-known method. For example, the inventive rubber composition for a tread having the aforementioned components is kneaded, extruded in an unvulcanized state correspondingly to the shape of a cap tread portion of the tire and molded on a tire molding machine by a general method along with other members of the tire, for forming an unvulcanized tire. The pneumatic tire according to the present invention can be obtained by heating and pressurizing this unvulcanized tire in a vulcanizer. This also applies to the inventive rubber compositions for a base tread, a bead apex, a clinch and an inner liner.

While the present invention is now described in more detail with reference to Examples and comparative examples, the present invention is not restricted to these.

Examples 1 to 5 and Comparative Examples 1 to 5

According to blending formulations shown in Table 1, components excluding sulfur and vulcanization accelerators were kneaded in a Banbury mixer under conditions of a rotational frequency of 80 rpm and a temperature of 150° C. for 3 minutes. Then, sulfur and vulcanization accelerators were added to the obtained mixtures with the loadings shown in Table 1 and the mixtures were thereafter kneaded in an open roll mill at 80° C. for 5 minutes, for obtaining unvulcanized rubber compositions. Then, the unvulcanized rubber compositions (rubber compositions for treads) were vulcanized at 150° C. for 30 minutes, thereby preparing vulcanized rubber test pieces according to Examples 1 to 5 and comparative examples 1 to 5 respectively.

TABLE 1

| | | Example | | | | | Comparative Example | | | | |
|---|---|---|---|---|---|---|---|---|---|---|---|
| | | 1 | 2 | 3 | 4 | 5 | 1 | 2 | 3 | 4 | 5 |
| Content (part by mass) | Epoxidized Natural Rubber | 100 | 100 | 100 | 100 | 100 | | 100 | 100 | 100 | 100 |
| | S B R | | | | | | 100 | | | | |
| | Silica | 72 | 72 | 72 | 72 | 72 | | 72 | 72 | 72 | 72 |
| | Carbon Black | 5 | 5 | 5 | 5 | 5 | 50 | 5 | | 5 | 5 |
| | Silane Coupling Agent | 5.76 | 5.76 | 5.76 | 5.76 | 5.76 | | 5.76 | 5.76 | 5.76 | 5.76 |
| | Soy Oil | 4 | 4 | 4 | 4 | 4 | | 4 | 4 | 4 | 4 |
| | Antioxidant | 2 | 2 | 2 | 2 | 2 | 5 | 2 | 2 | 2 | 2 |
| | Wax | 2 | 2 | 2 | 2 | 2 | 3 | 2 | 2 | 2 | 2 |
| | Calcium Stearate | 8 | 8 | 8 | 8 | 8 | | 2 | 8 | 8 | 8 |
| | Stearic Acid | 1 | 1 | 1 | 1 | 1 | 2 | 1 | 1 | 1 | 1 |

TABLE 1-continued

| | | Example | | | | | Comparative Example | | | | |
|---|---|---|---|---|---|---|---|---|---|---|---|
| | | 1 | 2 | 3 | 4 | 5 | 1 | 2 | 3 | 4 | 5 |
| | Zinc Oxide Particles | 2.4 | 3 | 1.5 | 0.5 | 0.5 | | | | | |
| | Zinc Oxide | | | 1.5 | 1.9 | 2.5 | 3 | 3 | 3 | 2.4 | 3 |
| | Sulfur | 2 | 2 | 2 | 2 | 2 | 2 | 2 | 2 | 2 | 2 |
| | Vulcanization Accelerator | 2.8 | 2.8 | 2.8 | 2.8 | 2.8 | 2.8 | 2.8 | 2.8 | 2.8 | 2.8 |
| Ratio of Nonpetroleum Resources (percent by mass) | | 91.5 | 91.5 | 91.5 | 91.5 | 91.5 | 10.2 | 91.3 | 93.8 | 91.5 | 91.5 |
| Result of Evaluation | Hardness | 68 | 68 | 68 | 68 | 68 | 70 | 68 | 68 | 68 | 68 |
| | Lambourn Abrasion Test | 100 | 95 | 92 | 92 | 92 | 100 | 88 | 90 | 88 | 85 |
| | L A T Abrasion Test | 100 | 98 | 95 | 97 | 93 | 90 | 85 | 87 | 89 | 87 |
| | Wet Gripping Performance Test | 100 | 103 | 99 | 98 | 95 | 120 | 98 | 95 | 97 | 99 |

The details of the components used for Examples 1 to 5 and comparative examples 1 to 5 are as follows:

(1) Epoxidized Natural Rubber (ENR): "ENR25" (epoxidation ratio: 25 mole percent) by Kumpulan Guthrie (2) SBR: "SBR1502" (styrene-butadiene rubber having a styrene unit quantity of 23.5 percent by mass) by Sumitomo Chemical Co., Ltd.

(3) Silica: "Z115Gr" (BET: 110 m$^2$/g) by Rhodia (4) Carbon Black (ISAF carbon): "Dia Black I" (BET: 114 m$^2$/g, DBP oil absorption: 115 ml/100 g) by Mitsubishi Chemical Corporation (5) Silane Coupling Agent: "Si266" (bis(3-triethoxysilyl-propyl)disulfide) by Degussa GmbH (6) Soy Oil: "Daizu Shirashimeyu" by The Nissin Oil Mills, Ltd.

(7) Antioxidant: "Vulkanox4020" (N-1,3-dimethylbutyl-N-phenyl-p-phenylenediamine) by Bayer Ltd.

(8) Wax: "OZOACE-0355" by Nippon Seiro Co., Ltd.

(9) Calcium Stearate: "GF200" by Shiraishi Calcium Kaisha, Ltd.

(10) Stearic Acid: "Tsubaki" by Nippon Oil and Fats Co., Ltd.

(11) Zinc Oxide Particles (zinc oxide used in Examples 1 to 5): "Zincox Super F-2" (average particle diameter: 65 nm) by Hakusuitech Ltd.

(12) Zinc Oxide (zinc oxide used in Examples 3 to 5 and comparative examples 1 to 5): zinc oxide "Nishu" (average particle diameter: 500 nm) by Mitsui Mining and Smelting Co., Ltd.

(13) Sulfur: powdered sulfur treated with 5% of oil by Tsurumi Chemical Co., Ltd.

(14) Vulcanization Accelerator: "Nocceler CZ" (N-cyclohexyl-2-benzothiazyl-sulfenamide) by Ouchi Shinko Chemical Industrial The following tests were conducted on the vulcanized rubber test pieces according to Examples 1 to 5 and comparative examples 1 to 5. Table 1 also shows the results.

(Hardness)

Type A durometer hardness levels were measured according to JIS-K6253.

(Lambourn Abrasion Test)

Volume losses of the vulcanized rubber test pieces were measured with a Lambourn abrasion tester (by Iwamoto Quartz GlassLab Co., Ltd.) under conditions of a temperature of 20° C., a test time of 5 minutes, a test surface speed of 80 m/min., a sand-falling quantity of 15 g/min., a load of 3.0 kgf and a slip ratio of 20%. Table 1 shows relative values with reference to the volume loss of Example 1 regarded as 100. Abrasion resistance is improved as the relative value is increased.

(LAT Abrasion Test)

Volume losses of the vulcanized rubber test pieces were measured with a LAT tester (Laboratory Abrasion and Skid Tester) under conditions of a load of 120 N, a speed of 20 km/h and a slip angle of 5°. Table 1 shows relative values with reference to the volume loss of Example 1 regarded as 100. Abrasion resistance is improved as the relative value is increased.

(Wet Gripping Performance Test)

Wet gripping performances of the vulcanized rubber test pieces were measured with a portable skid tester by Stanley Electric Co., Ltd. according to ASTM E303-83 (wet skid test). Table 1 shows relative values with reference to the volume loss of Example 1 regarded as 100. The wet gripping performance is improved as the relative value is increased.

Examples 6 to 10 and Comparative Examples 6 to 10

According to blending formulations shown in Table 2, components excluding sulfur and vulcanization accelerators were kneaded in a Banbury mixer under conditions of a rotational frequency of 80 rpm and a temperature of 150° C. for 3 minutes. Then, sulfur and vulcanization accelerators were added to the obtained mixtures with the loadings shown in Table 2 and the mixtures were thereafter kneaded in an open roll mill at 80° C. for 5 minutes, for obtaining unvulcanized rubber compositions. Then, the unvulcanized rubber compositions (rubber compositions for base treads) were vulcanized at 150° C. for 30 minutes, thereby preparing vulcanized rubber sheets according to Examples 6 to 10 and comparative examples 6 to 10 respectively.

TABLE 2

|  |  | Example | | | | | Comparative Example | | | | |
|---|---|---|---|---|---|---|---|---|---|---|---|
|  |  | 6 | 7 | 8 | 9 | 10 | 6 | 7 | 8 | 9 | 10 |
| Content (parts by mass) | Natural Rubber (N R) | 100 | 100 | 100 | 100 | 100 |  | 100 | 100 | 100 | 100 |
|  | S B R |  |  |  |  |  | 100 |  |  |  |  |
|  | Silica | 35 | 35 | 35 | 35 | 35 |  | 35 | 35 | 35 | 35 |
|  | Carbon Black |  |  |  |  |  | 35 |  |  |  |  |
|  | Soy Oil | 2 | 2 | 2 | 2 | 2 | 2 | 2 | 2 | 2 | 2 |
|  | Silane Coupling Agent | 2.8 | 2.8 | 2.8 | 2.8 | 2.8 |  | 2.8 | 2.8 | 2.8 | 2.8 |
|  | Antioxidant | 1.5 | 1.5 | 1.5 | 1.5 | 1.5 | 1.5 | 1.5 | 1.5 | 1.5 | 1.5 |
|  | Wax | 1.5 | 1.5 | 1.5 | 1.5 | 1.5 | 1.5 | 1.5 | 1.5 | 1.5 | 1.5 |
|  | Stearic Acid | 2 | 2 | 2 | 2 | 2 | 2 | 2 | 2 | 2 | 2 |
|  | Zinc Oxide Particles | 2.4 | 3 | 1.5 | 0.5 | 0.5 |  |  |  |  |  |
|  | Zinc Oxide |  |  | 1.5 | 1.9 | 2.5 | 3.5 | 3.5 | 3.5 | 3 | 3.5 |
|  | Sulfur | 2 | 2 | 2 | 2 | 2 | 2 | 2 | 2 | 2 | 2 |
|  | Vulcanization Accelerator C Z | 2.6 | 2.6 | 2.6 | 2.6 | 2.6 | 2.6 | 2.6 | 2.6 | 2.6 | 2.6 |
|  | Vulcanization Accelerator D P G | 0.5 | 0.5 | 0.5 | 0.5 | 0.5 | 0.5 | 0.5 | 0.5 | 0.5 | 0.5 |
|  | Vulcanization Accelerator M | 0.2 | 0.2 | 0.2 | 0.2 | 0.2 |  | 0.2 | 0.2 | 0.2 | 0.2 |
|  | Vulcanization Accelerator D M | 0.797 | 0.797 | 0.797 | 0.797 | 0.797 |  | 0.797 | 0.797 | 0.797 | 0.797 |
| Ratio of Nonpetroleum Resources (percent by mass) |  | 93.5 | 93.6 | 93.6 | 93.5 | 93.6 | 6.3 | 93.6 | 93.6 | 93.6 | 93.6 |
| Result of Evaluation | Hardness | 56 | 56 | 56 | 56 | 56 | 58 | 56 | 56 | 56 | 56 |
|  | Rolling Resistance | 100 | 95 | 92 | 92 | 92 | 65 | 88 | 90 | 88 | 87 |
|  | High-Speed Resistance (H/S Level) | A | B | B | B | B | D | C | C | C | C |

The details of the components used for Examples 6 to 10 and comparative examples 6 to 10 are as follows:

(1) Natural Rubber (NR): "SIR20" made in Indonesia (2) SBR: "SBR1502" (styrene-butadiene rubber having a styrene unit quantity of 23.5 percent by mass) by Sumitomo Chemical Co., Ltd.

(3) Silica: "Z115Gr" (BET: 110 m$^2$/g) by Rhodia (4) Carbon Black: "Dia Black N351H" (BET: 69 m$^2$/g, DBP oil absorption: 136 ml/100 g) by Mitsubishi Chemical Corporation (5) Soy Oil: "Daizu Shirashimeyu" by The Nissin Oil Mills, Ltd.

(6) Silane Coupling Agent: "Si266" (bis(3-triethoxysilyl-propyl)disulfide) by Degussa GmbH (7) Antioxidant: "Vulkanox 4020" (N-1,3-dimethylbutyl-N'-phenyl-p-phenylenediamine) by Bayer Ltd.

(8) Wax: "OZOACE-0355" by Nippon Seiro Co., Ltd.

(9) Stearic Acid: "Tsubaki" by Nippon Oil and Fats Co., Ltd.

(10) Zinc Oxide Particles (zinc oxide used in Examples 1 to 5): "Zincox Super F-2" (average particle diameter: 65 nm) by Hakusuitech Ltd.

(11) Zinc Oxide (zinc oxide used in Examples 3 to 5 and comparative examples 1 to 5): zinc oxide "Nishu" (average particle diameter: 500 nm) by Mitsui Mining and Smelting Co., Ltd.

(12) Sulfur: powdered sulfur treated with 5% of oil by Tsurumi Chemical Co., Ltd.

(13) Vulcanization Accelerator CZ: "Nocceler CZ" (N-cyclohexyl-2-benzothiazyl-sulfenamide) by Ouchi Shinko Chemical Industrial

(14) Vulcanization Accelerator DPG: "Perkacit DPG" (diphenylguanidine) by Flexsys Limited

(15) Vulcanization Accelerator M: "Sanceler M" (mercaptobenzothiazole) by Sanshin Chemical Industry

(16) Vulcanization Accelerator DM: "Sanceler DM" (dibenzothiazyl disulfide) by Sanshin Chemical industry The following tests were conducted on the vulcanized rubber sheets according to Examples 6 to 10 and comparative examples 6 to 10. Table 2 also shows the results.

(Hardness)

Type A durometer hardness levels were measured according to JIS-K6253.

(Rolling Resistance Test)

Loss tangents (tan δ) of the vulcanized rubber sheets according to Examples 6 to 10 and comparative examples 6 to 10 were measured with a viscoelasticity spectrometer by Ueshima Seisakusho Co., Ltd. under conditions of an initial strain of 10%, a dynamic strain of 1%, a frequency of 10 Hz and a temperature of 60° C. Table 2 shows relative values with reference to the loss tangent of Example 6 regarded as 100. The rolling resistance is reduced and low exothermicity is improved as the relative value is increased.

(High-Speed Durability Test)

First, unvulcanized rubber compositions for base treads (base tread portions) according to Examples 6 to 10 and comparative examples 6 to 10 were bonded to other members and press-vulcanized at 160° C. for 20 minutes, thereby preparing pneumatic tires (size: 215/60R16), Each pneumatic tire had the structure shown in FIG. 1, with the following details:

[Structure of Pneumatic Tire]

Carcass: made of polyester (1670 dtex/2)

Belt Layer: made of steel cords, with a structure of 2+2× 0.23 HT and an angle of 22°×22°

Thickness Ratio between Cap Tread Portion and Base Tread Portion: 7/3

High-speed durability values of the aforementioned pneumatic tires were measured with a high-speed durability machine by Kobe Steel, Ltd. according to ECE30. Table 2 shows the results. Referring to Table 2, "A", "B", "C" and "D" denote that the HIS levels are at least 250 km/h, at least 230 km/h and less than 250 km/h, at least 210 km/h and less than 230 km, and less than 210 km/h respectively.

Examples 11 to 13 and Comparative Example 11

According to blending formulations shown in Table 3, components excluding sulfur and vulcanization accelerators were filled in a Banbury mixer of 1.7 L by Kobe Steel, Ltd. so that the fill factors were 58%, and kneaded at a rotational frequency of 80 rpm for 3 minutes to reach 150° C. Then, sulfur and vulcanization accelerators were added to the obtained mixtures with the loadings shown in Table 3 and the mixtures were thereafter kneaded in an open roll mill at 80° C. for 5 minutes, for obtaining unvulcanized rubber compositions (rubber compositions for bead apexes). Then, the unvulcanized rubber compositions were vulcanized at 160° C. for 20 minutes, thereby preparing vulcanized rubber compositions according to Examples 11 to 13 and comparative example 11 respectively.

(Rubber Strength Test)

No. 3 dumbbell specimens were prepared from the vulcanized rubber compositions, and a tensile test was conducted according to JIS-K6251 "vulcanized rubber and thermoplastic rubber-method of obtaining tensile characteristics" for measuring breaking strength values (TB) and breaking extension values (EB) respectively. As to "rubber strength index", Table 3 shows relative values, each calculated according to

TABLE 3

| | | Example 11 | Example 12 | Example 13 | Comparative Example 11 |
|---|---|---|---|---|---|
| Content | Natural Rubber | 100 | 100 | 100 | 100 |
| (parts by mass) | Silica | 65 | 65 | 65 | 65 |
| | Silane Coupling Agent | 2.5 | 2.5 | 2.5 | 2.5 |
| | Hard Resin | 15 | 15 | 15 | 15 |
| | Stearic Acid | 2 | 2 | 2 | 2 |
| | Zinc Oxide | 0 | 0 | 0 | 4 |
| | Zinc Oxide Particles | 0.1 | 5 | 10 | 0 |
| | Sulfur | 3 | 3 | 3 | 3 |
| | Vulcanization Accelerator NS | 2 | 2 | 2 | 2 |
| | Vulcanization Accelerator H | 1.5 | 1.5 | 1.5 | 1.5 |
| Result of | Rubber Strength Index | 96 | 106 | 109 | 100 |
| Evaluation | Flex Cracking Resistance Test (70%) | 120 | 110 | 95 | 100 |

The details of the components used for Examples 11 to 13 and comparative example 11 are as follows:

(1) Natural Rubber (NR): TSR20

(2) Silica: "Ultrasyl VN3" (BET: 175 m²/g) by Degussa GmbH (3) Silane Coupling Agent: "Si266" (bis(3-triethoxysilyl-propyl)disulfide) by Degussa GmbH (4) Cured Resin: phenol-based cured resin "Sumilite Resin PR12686" by Sumitomo Bakelite Co., Ltd.

(5) Stearic Acid: "Kiri" by Nippon Oil and Fats Co., Ltd.

(6) Zinc Oxide (zinc oxide used in comparative example 1): zinc oxide (average particle diameter: 500 nm) by Mitsui Mining and Smelting Co., Ltd.

(7) Zinc Oxide Particles (zinc oxide used in Examples 1 to 3): "Zincox Super F-2" (average particle diameter: 65 nm) by Hakusuitech Ltd.

(8) Sulfur: powdered sulfur by Tsurumi Chemical Co., Ltd.

(9) Vulcanization Accelerator NS: "Nocceler NS" (N-tert-butyl-2-benzothiazolyl sulfenamide) by Ouchi Shinko Chemical Industrial

(10) Vulcanization Accelerator H; "Sanceler H" (hexamethylene tetramine) by Ogura-Sundine The following rubber strength test and de Mattia flex cracking test were conducted on the vulcanized rubber compositions according to Examples 11 to 13 and comparative example 11. Table 3 also shows the results.

the following equation, with reference to the rubber strength index of comparative example 11 regarded as 100. The breaking strength of the rubber is improved as the relative value is increased.

Rubber strength index={$(TB \times EB)$ of each Example}/{$(TB \times EB)$ of comparative example 11}×100

(de Mattia Flex Cracking Test)

According to JIS-K6260 "de Mattia flex cracking test for vulcanized rubber and thermoplastic rubber", the number of times causing breakage of 1 mm on each vulcanized rubber sample was measured under a condition of the room temperature of 25° C. Table 3 shows relative values with reference to the number of times in comparative example 11 regarded as 100. Referring to Table 3, "70%" denotes the extension percentage with respect to the original length of each vulcanized rubber sample.

Examples 14 to 16 and Comparative Example 12

According to blending formulations shown in Table 4, components excluding sulfur and vulcanization accelerators were filled in a Banbury mixer of 1.7 L by Kobe Steel, Ltd. so that the fill factors were 58%, and kneaded at a rotational frequency of 80 rpm for 3 minutes to reach 140° C. Then, sulfur and vulcanization accelerators were added to the obtained mixtures with the loadings shown in Table 4 and the mixtures were thereafter kneaded in an open roll mill at 80° C. for 5 minutes, for obtaining unvulcanized rubber compositions (rubber compositions for clinches). Then, the unvulcanized rubber compositions were vulcanized at 160° C. for 20 minutes, thereby preparing vulcanized rubber compositions according to Examples 14 to 16 and comparative example 12 respectively.

TABLE 4

|  |  | Example 14 | Example 15 | Example 16 | Comparative Example 12 |
|---|---|---|---|---|---|
| Content (parts by mass) | Natural Rubber | 70 | 70 | 70 | 70 |
|  | Epoxidized Natural Rubber | 30 | 30 | 30 | 30 |
|  | Silica | 65 | 65 | 65 | 65 |
|  | Silane Coupling Agent | 2.5 | 2.5 | 2.5 | 2.5 |
|  | Wax | 1 | 1 | 1 | 1 |
|  | Antioxidant | 2 | 2 | 2 | 2 |
|  | Stearic Acid | 2 | 2 | 2 | 2 |
|  | Zinc Oxide | 0 | 0 | 0 | 3 |
|  | Zinc Oxide Particles | 0.1 | 5 | 10 | 0 |
|  | Sulfur | 2 | 2 | 2 | 2 |
|  | Vulcanization Accelerator NS | 1 | 1 | 1 | 1 |
| Result of Evaluation | Rubber Strength Index | 95 | 105 | 108 | 100 |
|  | Picoabrasion Test | 96 | 103 | 97 | 100 |

The details of the components used for Examples 14 to 16 and comparative example 12 are as follows:

(1) Natural Rubber (NR): TSR20
(2) Epoxidized Natural Rubber (ENR): "ENR25" (epoxidation ratio: 25 mole percent) by Kumpulan Guthrie
(3) Silica: "Ultrasyl VN3" (BET: 175 m$^2$/g) by Degussa GmbH
(4) Silane Coupling Agent: "Si266" (bis(3-triethoxysilyl-propyl)disulfide) by Degussa GmbH
(5) Wax: "OZOACE-0355" by Nippon Seiro Co., Ltd.
(6) Antioxidant: "6C" (N-(1,3-dimethylbutyl)-N-phenyl-p-phenylenediamine) by Sumitomo Chemical Co., Ltd.
(7) Stearic Acid: "Kiri" by Nippon Oil and Fats Co., Ltd.
(8) Zinc Oxide (zinc oxide used in comparative example 1): zinc oxide (average particle diameter: 500 nm) by Mitsui Mining and Smelting Co., Ltd.
(9) Zinc Oxide Particles (zinc oxide used in Examples 1 to 3): "Zincox Super F-2" (average particle diameter: 65 nm) by Hakusuitech Ltd.
(10) Sulfur: powdered sulfur by Tsurumi Chemical Co., Ltd.
(11) Vulcanization Accelerator NS: "Nocceler NS" (N-tert-butyl-2-benzothiazolyl sulfenamide) by Ouchi Shinko Chemical Industrial The following rubber strength test and picoabrasion test were conducted on the vulcanized rubber compositions according to Examples 14 to 16 and comparative example 12. Table 4 also shows the results.

(Rubber Strength Test)

No. 3 dumbbell specimens were prepared from the vulcanized rubber compositions, and a tensile test was conducted according to JIS-K6251 "vulcanized rubber and thermoplastic rubber-method of obtaining tensile characteristics" for measuring breaking strength values (TB) and breaking extension values (EB) of the specimens respectively. As to "rubber strength index", Table 4 shows relative values, each calculated according to the following equation, with reference to the rubber strength index of comparative example 12 regarded as 100. The breaking strength of the rubber is improved as the relative value is increased.

Rubber strength index={(TB×EB) of each Example}/{(TB×EB) of comparative example 12}×100

(Picoabrasion Test)

According to JIS-K6264 "vulcanized rubber and thermoplastic rubber-method of obtaining abrasion resistance", each vulcanized rubber specimen was abraded under conditions of a surface rotational speed of 60 rpm, a load of 4 kg and a test time of 1 minute, and the weight change of each vulcanized rubber sample before and after the test was measured with a picoabrasion tester by Ueshima Seisakusho Co., Ltd. As to "picoabrasion index", Table 4 shows relative values, each calculated according to the following equation, with reference to the picoabrasion index of comparative example 12 regarded as 100. High severity abrasion resistance is increased as the relative value is increased.

Picoabrasion index={weight change of each Example}/{weight change of comparative example 12}×100

Examples 17 to 21 and Comparative Examples 13 to 17

According to blending formulations shown in Table 5, components excluding sulfur and vulcanization accelerators were kneaded in a Banbury mixer under conditions of a rotational frequency of 80 rpm and a temperature of 150° C. for 3 minutes. Then, sulfur and vulcanization accelerators were added to the obtained mixtures with the loadings shown in Table 5 and the mixtures were thereafter kneaded in an open roll mill at 80° C. for 5 minutes, for obtaining unvulcanized rubber compositions (rubber compositions for, inner liners). Then, the unvulcanized rubber compositions were vulcanized at 150° C. for 30 minutes, thereby preparing vulcanized rubber sheets according to Examples 17 to 21 and comparative examples 13 to 17 respectively.

TABLE 5

|  |  | Example |  |  |  |  | Comparative Example |  |  |  |  |
|---|---|---|---|---|---|---|---|---|---|---|---|
|  |  | 17 | 18 | 19 | 20 | 21 | 13 | 14 | 15 | 16 | 17 |
| Content (parts by mass) | Epoxidized Natural Rubber (E N R) | 100 | 100 | 100 | 100 | 100 |  | 100 | 100 | 100 | 100 |
|  | Chlorinated Butyl Rubber |  |  |  |  |  | 100 |  |  |  |  |
|  | Silica | 35 | 35 | 35 | 35 | 35 |  | 35 | 35 | 35 | 35 |
|  | Carbon Black |  |  |  |  |  | 60 |  |  |  |  |
|  | Silane Coupling Agent | 3.2 | 3.2 | 3.2 | 3.2 | 3.2 |  | 3.2 | 3.2 | 3.2 | 3.2 |
|  | Antioxidant | 1 | 1 | 1 | 1 | 1 | 1.5 | 1 | 1 | 1 | 1 |

TABLE 5-continued

|  | Example | | | | | Comparative Example | | | | |
| --- | --- | --- | --- | --- | --- | --- | --- | --- | --- | --- |
|  | 17 | 18 | 19 | 20 | 21 | 13 | 14 | 15 | 16 | 17 |
| Calcium Stearate | 2 | 2 | 2 | 2 | 2 |  | 2 | 2 | 2 | 2 |
| Stearic Acid | 1.5 | 1.5 | 1.5 | 1.5 | 1.5 | 2 | 1.5 | 1.5 | 1.5 | 1.5 |
| Zinc Oxide Particles | 1.8 | 2 | 1 | 0.8 | 0.5 |  |  |  |  |  |
| Zinc Oxide |  |  | 1 | 1 | 1.3 | 3.5 | 3.5 | 3.5 | 3 | 3.5 |
| Sulfur | 1.5 | 1.5 | 1.5 | 1.5 | 1.5 | 2 | 1.5 | 1.5 | 1.5 | 1.5 |
| Vulcanization Accelerator C Z | 0.5 | 0.5 | 0.5 | 0.5 | 0.5 |  | 0.5 | 0.5 | 0.5 | 0.5 |
| Vulcanization Accelerator D P G | 0.25 | 0.25 | 0.25 | 0.25 | 0.25 | 1.25 | 0.25 | 0.25 | 0.25 | 0.25 |
| Vulcanization Accelerator M | 0.2 | 0.2 | 0.2 | 0.2 | 0.2 |  | 0.2 | 0.2 | 0.2 | 0.2 |
| Vulcanization Accelerator D M | 0.5 | 0.5 | 0.5 | 0.5 | 0.5 |  | 0.5 | 0.5 | 0.5 | 0.5 |
| Ratio of Nonpetroleum Resources | 96.2 | 96.2 | 96.2 | 96.2 | 96.2 | 4.4 | 96.2 | 96.2 | 96.2 | 96.2 |
| Result of Evaluation — Hardness | 58 | 58 | 58 | 58 | 58 | 60 | 58 | 58 | 58 | 58 |
| Result of Evaluation — Rolling Resistance | 100 | 95 | 92 | 92 | 92 | 125 | 88 | 90 | 88 | 90 |
| Result of Evaluation — Air Permeability | A | B | B | B | B | A | C | C | C | C |
| Result of Evaluation — Flex Cracking Resistance | 100 | 95 | 90 | 87 | 85 | 70 | 70 | 70 | 65 | 65 |

The details of the components used for Examples 17 to 21 and comparative examples 13 to 17 are as follows:

(1) Epoxidized Natural Rubber (ENR): "ENR25" (epoxidation ratio: 25 mole percent) by Kumpulan Guthrie (2) Chlorinated Butyl Rubber: "Chlorobutyl HT1066" by Exxon Chemical (3) Silica: "Ultrasyl VN3" (BET: 175 m²/g) by Degussa GmbH (4) Carbon Black: "Dia Black G" (BET: 27 m²/g, DBP oil absorption: 87 ml/100 g) by Mitsubishi Chemical Corporation (5) Silane Coupling Agent: "Si266" (bis(3-triethoxysilyl-propyl)disulfide) by Degussa GmbH (6) Antioxidant: "Antioxidant FR" (refined product of 2,2,4-trimethyl-1,2-dihydroquinoline derivative) by Matsubara Industries, Inc.

(7) Calcium Stearate: "GF200" by Shiraishi Calcium Kaisha, Ltd.

(8) Stearic Acid: "Tsubaki" by Nippon Oil and Fats Co., Ltd.

(9) Zinc Oxide Particles (zinc oxide used in Examples 1 to 5): "Zincox Super F-2" (average particle diameter: 65 nm) by Hakusuitech Ltd.

(10) Zinc Oxide (zinc oxide used in Examples 3 to 5 and comparative examples 1 to 5): zinc oxide "Nishu" (average particle diameter: 500 nm) by Mitsui Mining and Smelting Co., Ltd.

(11) Sulfur: powdered sulfur treated with 5% of oil by Tsurumi Chemical Co., Ltd.

(12) Vulcanization Accelerator CZ: "Nocceler CZ" (N-cyclohexyl-2-benzothiazyl-sulfenamide) by Ouchi Shinko Chemical Industrial

(13) Vulcanization Accelerator DPG: "Perkacit DPG" (1,3-diphenylguanidine) by Flexsys Limited

(14) Vulcanization Accelerator M: "Sanceler M" (2-mercapto-benzothiazole) by Sanshin Chemical Industry

(15) Vulcanization Accelerator DM: "Sanceler DM" (dibenzothiazyl disulfide) by Sanshin Chemical Industry (Hardness)

Type A durometer hardness levels were measured according to JIS-K6253.

(Rolling Resistance Test)

Loss tangents (tag) of vulcanized rubber sheets according to Examples 17 to 21 and comparative examples 13 to 17 were measured with a viscoelasticity spectrometer by Ueshima Seisakusho Co., Ltd. under conditions of an initial strain of 10%, a dynamic strain of 1%, a frequency of 10 Hz and a temperature of 60° C. Table 5 shows relative values with reference to the loss tangent of Example 17 regarded as 100. The rolling resistance is reduced and low exothermicity is improved as the relative value is increased.

(Air Permeability Test)

Air permeability values of the vulcanized rubber sheets according to Examples 17 to 21 and comparative examples 13 to 17 were measured with a gas permeability tester by Ueshima Seisakusho Co., Ltd. under conditions of the ordinary temperature and the ordinary pressure. Table 5 also shows the results, Referring to Table 5, "A", "B" and "C" denote permeability coefficients of at least 5 and less than 10 ($\times 10^{11}$ cm²·cm/cm²·s·cmHg), at least 10 and less than 15 ($\times 10^{11}$ cm²·cm/cm²·s·cmHg) and at least 15 and less than 20 ($\times 10^{11}$ cm²·cm/cm²·s·cmHg) respectively.

(Flex Cracking Test)

According to JIS-K6260 "de Mattia flex cracking test for vulcanized rubber and thermoplastic rubber", the number of times causing breakage of 1 mm on each vulcanized rubber sample was measured under a condition of the room temperature of 25° C. Table 5 shows relative values with reference to the number of times in Example 17 regarded as 100. Referring to Table 5, "70%" denotes the extension percentage with respect to the original length of each vulcanized rubber sample.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A rubber composition for tread rubber of a tire comprising 0.1 to 10 parts by mass of first zinc oxide particles having an average particle diameter of from 1 nm to 150 nm with respect to 100 parts by mass of a rubber component and not more than 2.5 parts by mass of second zinc oxide particles having an average particle diameter of at least 200 nm with respect to 100 parts by mass of the rubber component, wherein said rubber component contains epoxidized natural rubber.

2. The rubber composition according to claim 1, further containing 60 to 90 parts by mass of silica with respect to 100 parts by mass of said rubber component.

3. A pneumatic tire comprising tread rubber consisting of the rubber composition according to claim 1.

4. A rubber composition for base tread rubber of a tire comprising 0.1 to 10 parts by mass of zinc oxide particles having an average particle diameter of from 1 nm to 150 nm with respect to 100 parts by mass of a rubber and not more than 2.5 parts by mass of second zinc oxide particles having an average particle diameter of at least 200 nm with respect to 100 parts by mass of the rubber component, wherein said rubber component contains natural rubber.

5. The rubber composition according to claim 4, further containing 30 to 50 parts by mass of silica with respect to 100 parts by mass of said rubber component.

6. A pneumatic tire comprising base tread rubber consisting of the rubber composition according to claim 4.

7. A rubber composition for inner liner rubber of a tire comprising 0.1 to 10 parts by mass of first zinc oxide particles having an average particle diameter of from 1 nm to 150 nm with respect to 100 parts by mass of a rubber component and not more than 2.5 parts by mass of second zinc oxide particles having an average particle diameter of at least 200 nm with respect to 100 parts by mass of the rubber component, wherein said rubber component contains epoxidized natural rubber.

8. The rubber composition according to claim 7, further containing 30 to 50 parts by mass of silica with respect to 100 parts by mass of said rubber component.

9. A pneumatic tire comprising inner liner rubber consisting of the rubber composition according to claim 7.

10. A pneumatic tire having a tread comprising the rubber composition of claim 1.

11. A pneumatic tire having an inner liner comprising the rubber composition of claim 7.

12. The rubber composition according to claim 1, wherein a mass ratio of the second zinc oxide particles to the first zinc oxide particles is not more than 5.

13. The rubber composition according to claim 4, wherein a mass ratio of the second zinc oxide particles to the first zinc oxide particles is not more than 5.

14. The rubber composition according to claim 7, wherein a mass ratio of the second zinc oxide particles to the first zinc oxide particles is not more than 5.

* * * * *